United States Patent
Somercik

(10) Patent No.: US 11,226,615 B2
(45) Date of Patent: Jan. 18, 2022

(54) CONTROL SYSTEM FOR MACHINE WITH A PLURALITY OF COMPONENTS AND METHODS OF OPERATION

(71) Applicant: LATERAL SOLUTIONS, INC., Plymouth, MI (US)

(72) Inventor: Christopher A. Somercik, Plymouth, MI (US)

(73) Assignee: LATERAL SOLUTIONS, INC., Plymouth, MI (US)

( * ) Notice: Subject to any disclaimer, the term of this patent is extended or adjusted under 35 U.S.C. 154(b) by 68 days.

(21) Appl. No.: 16/607,890

(22) PCT Filed: May 2, 2018

(86) PCT No.: PCT/US2018/030733
§ 371 (c)(1),
(2) Date: Oct. 24, 2019

(87) PCT Pub. No.: WO2018/204540
PCT Pub. Date: Nov. 8, 2018

(65) Prior Publication Data
US 2020/0064823 A1    Feb. 27, 2020

Related U.S. Application Data

(60) Provisional application No. 62/500,385, filed on May 2, 2017, provisional application No. 62/624,271, filed on Jan. 31, 2018.

(51) Int. Cl.
*G05B 23/02* (2006.01)
(52) U.S. Cl.
CPC .............................. *G05B 23/0264* (2013.01)

(58) Field of Classification Search
CPC .................................................. G05B 23/0264
(Continued)

(56) References Cited

U.S. PATENT DOCUMENTS 5,469,447 A    11/1995   Brunemann, Jr. et al.
5,566,092 A    10/1996   Wang et al.
(Continued)

OTHER PUBLICATIONS

European Search Report, Application No. 18794456 dated Jun. 17, 2020.
(Continued)

*Primary Examiner* — Jigneshkumar C Patel
(74) *Attorney, Agent, or Firm* — The Dobrusin Law Firm, P.C.; Daniela M. Thompson-Walters

(57) ABSTRACT

A method, control system, and software for operating a machine having two or more components which allows for a) controlling one or more operations two or more components of the machine using a data processor with a plurality of control signals; b) time-stamping the control signals with the data processor; c) storing the time-stamped control entries for subsequent retrieval in a storage medium; d) sensing a plurality of operating conditions of each of the two or more components of the, wherein the sensing is substantially simultaneous with the controlling step and the two or more monitoring devices communicate by transmitting data signals corresponding to the plurality of operating conditions substantially in real-time to the data processor; e) time-stamping the data signals with the data processor; and f) storing the time-stamped data entries for subsequent retrieval in the storage medium.

17 Claims, 7 Drawing Sheets

(58) Field of Classification Search
USPC .......................................................... 700/14
See application file for complete search history.

(56) References Cited

U.S. PATENT DOCUMENTS

| | | | |
|---|---|---|---|
| 6,411,908 B1 | 6/2002 | Talbott | |
| 6,577,934 B2 | 6/2003 | Matsunaga et al. | |
| 6,587,812 B1 | 7/2003 | Takayama | |
| 6,816,815 B2 | 11/2004 | Takayama | |
| 6,948,102 B2 | 9/2005 | Smith | |
| 7,401,263 B2 | 7/2008 | Dubois, Jr. et al. | |
| 7,882,394 B2 | 2/2011 | Hosek et al. | |
| 8,356,207 B2 | 1/2013 | Hosek et al. | |
| 8,560,096 B1 | 10/2013 | Chapman | |
| 8,689,055 B2 | 4/2014 | Church et al. | |
| 9,104,650 B2 | 8/2015 | Hosek et al. | |
| 9,116,965 B2 | 8/2015 | Callan | |
| 9,367,974 B1 | 6/2016 | Hawver et al. | |
| 9,400,490 B2 | 7/2016 | Turolla | |
| 9,607,451 B2 | 3/2017 | Mouterde | |
| 2002/0040278 A1 | 4/2002 | Anuzis et al. | |
| 2008/0082180 A1 | 4/2008 | Blevins | |
| 2011/0173496 A1 | 7/2011 | Hosek et al. | |
| 2011/0219327 A1 | 9/2011 | Middleton, Jr. | |
| 2013/0223494 A1* | 8/2013 | Jensen | G05B 23/0264 375/224 |
| 2015/0220080 A1 | 8/2015 | Nixon | |
| 2015/0304193 A1 | 10/2015 | Ishii et al. | |
| 2017/0102696 A1 | 4/2017 | Bell et al. | |

OTHER PUBLICATIONS

International Search Report for Application No. PCT/US2018/030733 dated Aug. 7, 2018.

\* cited by examiner

| TIME-STAMP | | COMPONENT | | | | | | |
|---|---|---|---|---|---|---|---|---|
| Date | Time (ms) | Inverter Voltage | Motor Current | Motor Voltage | Pallet Position | Encoder Value | Accelerometer | Error Status |
| 1/1/2018 | 10 | | | | | | | |
| 1/1/2018 | 20 | | | | | | | |
| 1/1/2018 | 30 | | | | | | | |
| 1/1/2018 | 40 | | | | | | | |
| 1/1/2018 | 50 | | | | | | | |
| 1/1/2018 | 60 | | | | | | | |
| 1/1/2018 | 70 | | | | | | | |
| 1/1/2018 | 80 | | | | | | | |
| 1/1/2018 | 90 | | | | | | | |
| . | | | | | | | | |
| . | | | | | | | | |
| . | | | | | | | | |
| 1/1/2018 | 30,000 | | | | | | | |

*FIG.-7*

CONTROL SYSTEM FOR MACHINE WITH A PLURALITY OF COMPONENTS AND METHODS OF OPERATION

FIELD

The teachings herein generally relate to a machine having two or more components and methods of operating the machine via a control system. The teachings herein may be useful in collecting and analyzing real-time process information while the machine is in operation. The teachings herein may find particular use in identifying one or more anomalous conditions, faults, or both within a machine while in operation.

BACKGROUND

In manufacturing, a common cause of production downtime results from failures in automated machines used within the manufacturing process. Often, diagnostics are necessary to determine which component(s) failed and what caused the component to fail. Traditionally, diagnostics required physically inspecting the components to understand the failure and fixing the components via a "trial and error" approach until the machine was once again operational. This approach may result in significant downtime. A more recent approach has been to incorporate advanced diagnostics into the machine or in communication with the machine. Some systems may be able to detect a fault, isolate a fault to determine a location, or both. For example, the existing systems described in U.S. Pat. No. 9,104,650 identify how systems detect and isolate faults. Generally, these advanced diagnostics are either embedded within a control program at a local controller for the machine (e.g., the same control program which when executed controls one or more operations of the machine) or within an external computer which monitors the control data and provides the subsequent analysis. These approaches may result in an overly complex machine control program to accommodate the advanced diagnostic capability; the additional cost of servers to handle the advanced diagnostic capability and data gathered; and the possibility of information loss due to the non-real-time operation of network information queries. Additionally, these approaches may require the diagnostics to be completed after a fault condition has occurred, then gathering and analyzing the data, and thus still resulting in significant downtime.

In an effort to address some of these concerns, controllers which both collect data from one or more machines and analyze the data to some extent have been developed, such as the system described in U.S. Pat. No. 9,104,650, incorporated herein by reference in its entirety for all purposes. Notwithstanding the above, there is still a need for a system which is able to control operations of a plurality of components of a machine while simultaneously collecting data relative to the operations; correlating and reconciling the data from a plurality of components and operating conditions with one another to identify relationships between the fault or anomalous condition in one component to a fault or anomalous condition in one or more other components of the machine; and automatically performing advanced diagnostics to identify one or more anomalous conditions or faults within the machine.

Conventionally, it may be thought that the more data which is collected and analyzed from one or more operations leads to increased accuracy in identifying one or more faults, anomalous conditions, or both within a machine. Capturing as much data as possible as a continuous stream of data for extended periods of time for a plurality of components of a machine while simultaneously analyzing the same data for the machine and controlling operations of the machine may require extremely high processing power, which may be cost prohibitive for use most manufacturing environments. Thus, there is still a need for an unconventional system which is able to capture data related to operating conditions of a machine over a continuously moving predetermined time period in predetermined time increments to allow a processor to identify in substantial real-time one or more anomalous conditions or faults without comprising the processor's ability to control one or more operations of the machine.

What is needed is a control system architecture which allows for modular diagnostic analytics to be separate from the control program while cooperating with the control system to allow for advanced diagnostics within a same hardware platform. What is needed is the ability to harvest data in real-time for a plurality of components within a machine which allows for identification of one or more anomalous conditions. What is needed is harvesting of process data in real-time of the machine to allow correlation of one or more data entries to one or more other data entries and thus allow identification of one or more causes of one or more anomalous conditions. What is needed is the ability to add one or more different diagnostic software modules at any time which are able to cooperate with the control system and control programs of the system to analyze the real-time harvested process data. What is needed is the ability to harvest the process data from the machine without requiring an additional server. Another need is to provide a control system which maintains performance of the control system and avoids overloading any data processors by the diagnostic software modules.

SUMMARY

A method of operating a machine having two or more components with a control system comprising: (a) controlling one or more operations of each of the two or more components of the machine using a data processor with a plurality of control signals; (b) time-stamping the control signals with the data processor to form time-stamped control entries corresponding with the plurality of the control signals; (c) storing the time-stamped control entries for subsequent retrieval in a storage medium; (d) sensing a plurality of operating conditions of each of the two or more components of the machine with two or more monitoring devices, wherein the sensing is substantially simultaneous with the controlling step and at a predetermined condition frequency, and wherein the two or more monitoring devices communicate by transmitting data signals corresponding to the plurality of operating conditions substantially in real-time to the data processor; (e) time-stamping the data signals with the data processor to form time-stamped data entries corresponding with the data signals; and (f) storing the time-stamped data entries for subsequent retrieval in the storage medium.

A control system which controls operation of a machine having two or more components and comprises: a) one or more first storage mediums having one or more control programs stored therein, wherein the one or more control programs are configured to instruct one or more data processors to control operations of each of the two or more component of the machine; b) the one or more data processors in communication with the one or more storage mediums and further configured to time-stamp a plurality of control signals to form time-stamped control signals and time-stamp a plurality of data signals to form time-stamped data signals; c) one or more monitoring devices in communication with the one or more data processors and configured to sense a plurality of operating conditions of the two or more components of the machine and transmit the plurality of data signals corresponding to the plurality of operating conditions to the one or more data processors; and d) one or more second storage mediums in communication with the data processor and configured to receive the time-stamped control entries and the time-stamped data entries from the one or more data processors.

A software for a control system which controls operation of two or more components of a machine located within a non-transitory computer readable medium, the software comprising: (a) a means to control one or more data processors to control one or more operations of the two or more components of the machine; (b) a means to control the one or more data processors to time-stamp a plurality of control signals to form time-stamped control entries; (c) a means to control the one or more data processors to time-stamp a plurality of data signals to form time-stamped data entries; (d) a means to direct one or more monitoring devices to sense a plurality of operating conditions of the two or more components of the machine; (e) a means to direct one or more monitoring devices to transmit the plurality of data signals corresponding to the plurality of operating conditions to the one or more data processors; and (f) a means to direct the time-stamped data entries, the time-stamped control entries, or both from the one or more data processors to a storage medium for subsequent retrieval and analysis.

The diagnostic capability may be provided as a separate program that can be modularly added to the system with the ability to use the real-time process data for analysis and is not required for the control of the machine. Control system performance may not be compromised with this approach by having the advanced diagnostics separate from the control program(s) which control operation of one or more machines while having the diagnostics in communication with one or more storage mediums for analyzing the harvested data. The control program and data analysis modules may be stored in one or more separate storage mediums and the harvested data. The harvested data may be stored within a volatile storage medium and thus allowing for quicker retrieval and analysis of the data stored therein by the processor using one or more data analysis modules. The harvested data may be stored within a predefined data structure of a database. The predefined data structure may collect data over a predetermined period of time over predetermined time intervals. Once harvested data fall outside of the predetermined period of time, the data may be transferred to a separate storage medium (e.g., server or other memory) or removed from the system (e.g., deleted). The predetermined period of time with predetermined time intervals of a predetermined data structure is advantageous in allowing one or more processors to quickly and efficiently retrieve and analyze the data by executing one or more data analysis modules while controlling operations of one or more components by executing one or more control programs. The advanced diagnostics (e.g., data analysis modules) may reside within a same or different storage mediums as the control program(s) and thus allowing the programming to be executed distinctly. The use of multi-threaded/multi-operating system control platforms may provide a means to provide diagnostic capability. By having process data stored within one or more storage mediums in communication with the one or more data processors within a same controller, a server may not be required to harvest the data directly for analysis. The diagnostics modules may be able to process and/or packetize the harvested data to transmit to a server, separate storage mediums, or both.

The present disclosure incorporates the teachings from U.S. Provisional Patent Application Nos. 62/500,385 filed on May 2, 2017 and 62/624,271 filed on Jan. 31, 2018 which are incorporated herein by reference in their entirety for all purposes.

BRIEF DESCRIPTION OF DRAWINGS

FIG. 7 illustrates a data structure of a database according to the teachings herein.

DETAILED DESCRIPTION

Figure 1:
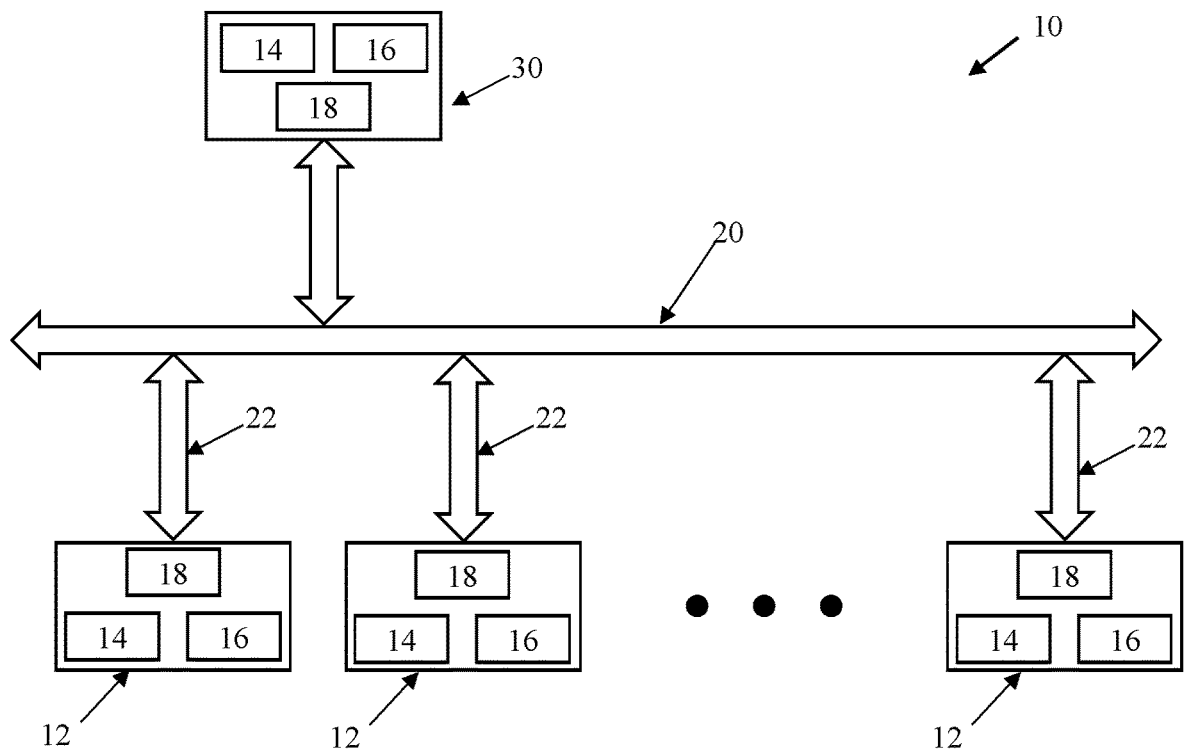
FIG. 1 illustrates a block diagram of a traditional factory information system architecture of a control system.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Control System

The disclosure relates to a control system, method of operating one or more machines with the control system, and software to operate the control system. The control system may function to control operation of one or more machines, particularly those having two or more components. The control system may include one or more data processors, programs, sensing or monitoring devices, storage mediums, data analysis modules, processor load control features, or any combination thereof. The control system may be particularly beneficial in allowing for gathering and analyzing of real-time process data while controlling ongoing operations of one or more components of a machine. The control system may allow for control programs to be separated from diagnostic programs (e.g., data analysis modules), either within a same processor or different processors, same storage medium or different storage medium, or combination thereof. The diagnostic programs may be particularly useful in analyzing the real-time process data to identify one or more anomalous conditions within the machine in real-time or in close proximity to real-time. By identifying the one or more anomalous conditions within the machine in real-time, a cause of the anomalous condition may be identified before resulting in a more serious fault condition, damage to the machine, production downtime to repair the machine, and the like. Further, by identifying the one or more anomalous conditions in real-time, preventative maintenance may be scheduled to address the cause of the anomalous condition without impacting production, such as during scheduled production breaks. The diagnostic capability may be separate software that can be modularly added to the control system and is not required for the control of the machine. By having the diagnostic software separate from control programs which control operations of machine components, performance of the control system may not be compromised. The diagnostic hardware may be added as one or more separate software modules at any time. The software modules may then have access to a database structure stored within one or more storage mediums having process data stored therein. A control system may include or be in communication with one or more machines, one or more components of a machine, one or more servers, one or more controllers, one or more storage mediums, one or more databases, one or more data processors (e.g., processors), one or more monitoring devices, machine process data generated within the system, machine process data stored within the system, one or more control programs, one or more data analysis modules, one or more networks, the like, or any combination thereof.

Machine and Components

The teachings herein may be particularly useful in the operation of one or more machines. Operation of one or more machines may be controlled by a control system according to the teachings herein. The control system may be considered as part of one or more machines or connected to the one or more machines. The one or more machines may include any machine being at least partially controlled by one or more data processors (e.g., computer-controlled machine, automated machine). The one or more machines may be suitable for any type of environment in which an at least partially automated system may be advantageous. The one or more machines may be used in aerospace applications, defense applications, automotive applications, foundry applications, die casting operations, composite forming processes, medical applications, pharmaceutical applications, sealing and dispensing applications, the like, or any combination thereof. For example, the one or more machines may include one or more manufacturing machines. The machine may include one or more robotic machines suitable for welding (e.g., arc welding, spot welding), assembly, machine tending, material handling, material removal, part transfer, kitting, forming and processing, painting, coating, sealing, finishing, part inspection, labeling (e.g., laser marking, sticker labeling), spraying, the like, or any combination thereof. One or more machines may refer to a single machine or a plurality of machines. One or more machines may reside within one station of a facility, such as one station within a manufacturing facility, or a plurality of stations. One or more machines may include one or more components.

The one or more machines may include one or more components. The one or more components may function to perform one or more operations of a machine, may function to sense one or more operations of a machine, may cooperate with other components of the machine to perform one or more operations, or any combination thereof. The one or more components may be controlled by one or more data processors. For example, a plurality of components may in communication with a controller have a data processor therein. The one or more data processors may execute one or more control programs. Execution of one or more control programs may result in execution of one or more operations of one or more components. Execution of one or more control programs may result in transmission of one or more control signals. The one or more components may receive one or more control signals from one or more data processors. The one or more components may include one or more processors stored therein. The one or more component processors may receive the one or more control signals from the processor of a controller. The one or more components may be free of a dedicated processor within the component. The one or more components may receive the one or more control signals from a processor of a controller as an electrical signal. Upon receipt of the one or more control signals, the one or more components may be configured into one or more operating conditions, such as performing one or more operations. One or more components may include a single component or a plurality of components. A plurality of components may include two or more components, three or more components, four or more components, or even ten or more components. A plurality of components may include fifty or less components, forty or less components, or even twenty or less components of a machine. The number of components controlled by a single controller may be even greater and dependent on the number if input and output ports, process capability, and/or memory storage space of the controller.

The control system of the teachings herein may be particularly useful in controlling operation of two or more components of a machine having a controller in common and gathering process data related to those two or more components within the same controller. The one or more components may be any component of a machine capable of being controlled by the one or more data processors. For example, components of a machine may include one or more controllers (e.g., programmable logic controllers), motors, gear boxes, brakes in communication with the motor and/or gear box, inverters for controlling of a motor, control relays, busses, air cylinders, robotic end effectors (e.g., gripper, weld tip, sensors, material removal tools, material application tools, etc.), conveyance portions (e.g., rollers, belts, chains, etc.), the like, or any combination thereof. Operation of the one or more components may be controlled by a control system.

Server(s) and Controller(s)

The control system may include one or more servers. The one or more servers may function to store one or more entries, analyze one or more entries, or both. One or more servers may be particularly advantageous in providing additional (e.g., supplementary) analysis of one or more entries from one or more controllers, providing longer term storage of one or more data entries as compared to one or more controllers, or both. The server may include one or more non-transitory computer readable mediums. A server may include one or more boards (e.g., motherboard), data processors, storage mediums, network interfaces, power supply, circuitry, graphics adapters, input ports and output ports, the like, or any combination thereof. Exemplary storage mediums suitable for use within a server may include one or more hard drives, read only memory, random access memory, cache, the like, or a combination thereof. One or more network interfaces may include one or more network adapters. A network adapter may be suitable for allowing the server to communicate over a network. Over the network, a server may be in communication with one or more controllers. Over the network, one or more signals may be transmitted from one or more controllers to one or more servers. For example, data entries stored within a storage medium of a controller may be transferred to a storage medium of a server. A server may be in communication with a single controller or a plurality of adapters via a network. A server may be useful in viewing a plurality of databases from a plurality of controllers simultaneously, juxtaposing a plurality of databases, or both. A plurality of databases may be juxtaposed based on one or more identifies, such as a time-stamp. A plurality of databases may be merged within a server based on a common identifier, such as common time-stamp information. For example, a server may allow for a plurality of databases from a plurality of controllers to be juxtaposed and merged to identify relationships between components of different stations and controlled by different controllers. A server may be advantageous in monitoring multiple controllers simultaneously. A server may not be necessary in executing one or more control programs, data analysis modules, or both of one or more controllers. Thus, the control system may also be free of a server.

The control system may include one or more controllers. The one or more controllers may function to control one or more machines, store one or more entries related to performance of a machine, analyze one or more entries related to the performance of a machine, or a combination thereof. One or more controllers may be particularly advantageous in simultaneously controlling operations of one or more components of a machine while analyzing one or more entries related to the performance of the machine in substantial real-time. A controller may include one or more control programs stored therein to enable the controller to control operations of one or more components of a machine. The controller may include one or more data analysis modules stored therein to analyze one or more entries related to the performance of the machine in substantial real-time, in parallel and/or simultaneous within executing one or more control programs, or both. A controller may include one or more non-transitory computer readable mediums. A controller may include one or more boards (e.g., motherboard), data processors, storage mediums, network interfaces, power supply, circuitry, graphics adapters, input ports and output ports, the like, or any combination thereof. Exemplary storage mediums suitable for use within a controller may include one or more hard drives, solid state drives, read only memory, random access memory, cache, the like, or a combination thereof.

One or more storage mediums of a controller may include one or more operating systems. One or more operating systems may include two or more operating systems. Two or more operating systems may include a first operating system and a second operating system. Dual operating systems may be advantageous as one operating system may particularly better suited for controlling operations of one or more components while another operating system may be better suited for analyzing data. For example, a controller may include a first operating system compatible with a programmable logic controller (e.g., LINUX, Siemens programmable logic controller (PLC) operating system, or another programmable automation controller operating (PAC) system) and a second operating system compatible with Microsoft Windows and/or or a Mac operating system. A second operating system may also be beneficial in providing a more user-friendly user interface for the controller. Each operating system may be stored or hosted within a separate storage medium or within a common and shared storage medium.

A controller may include a single or a plurality of data processors, storage mediums, or both. A controller may include a single processor and a plurality of storage mediums. A controller may include a plurality of processors and a single storage medium. For example, a controller may include a single processor in communication with a solid-state drive and a random-access memory. The solid-state drive may be programmed with one or more operating systems. The solid-state drive may be programmed with two or more operating systems. Two or more operating systems may allow for the processor to cooperate with both operating systems. As another example, a controller may include two separate processors, each in communication with a separate hard drive or solid-state drive, and both processors in communication with a single random-access memory. Again, this may allow the controller to run separate operating systems on each respective hard drive or solid-state drive. As another example, a single processor may be in communication with two drives (e.g., hard drive, solid-state) and a single random-access memory, and each drive may host an operating system. The advantage of executing two more operating systems within a single controller allows for execution of one or more data analysis modules via one operating system while executing one or more control programs via another operating system while accessing the same data stored within a common storage medium, such as the random-access memory. A common storage medium accessible by both one or more control programs and one or more data analysis modules may be advantageous in allowing for quicker retrieval of the data stored therein. For example, random-access memory typically allows for faster retrieval and processing of data by a processor as compared to a hard drive or solid-state drive. A controller may include one or more network interfaces, which may include one or more network adapters. A network adapter may be suitable for allowing the controller to communicate over a network. Over the network, a controller may be in communication with one or more other controllers, one or more components, one or more servers, or a combination thereof. Over the network, one or more signals may be transmitted from one or more controllers to one or more servers and/or vice-versa. For example, entries stored within a storage medium of a controller may be transferred to a storage medium of a server via a network. Exemplary controllers may include one or more programmable logic controllers (PLC), dedicated personal computers (PC), micro controllers, the like, or any combination thereof.

Storage Medium(s)

The control system may include one or more storage mediums. The one or more storage mediums function to receive one or more signals (e.g., control signals, data signals), store the signals as one or more entries (e.g., control entries, data entries), organize the one more entries, or any combination thereof. Machine process data may also be sent via a backplane of the control system to a separate processor simultaneously, in combination with, or in lieu of transmitting to the storage medium. A backplane of a control system may refer to a control board to which circuit boards tied to a plurality of data processors may be connected. One or more storage mediums may include one or more non-transient storage mediums. One or more storage mediums may be a temporary storage area, semi-permanent storage area, and/or permanent storage area. One or more storage mediums may include volatile storage, non-volatile storage, or both. One or more storage mediums may include one or more hard drives (e.g., hard drive memory), solid-state drives, read only memory (ROM), chips (e.g., Random Access Memory ("RAM")), cache, discs, flash drives, memory cards, the like, or any combination thereof. A semi-permanent storage area, permanent storage area, or both may include one or more hard drives, solid-state drives, read only memory, or a combination thereof. A hard drive and solid-state drive may be referred to a drive. A temporary storage area may include random access memory (RAM), cache, or both. A temporary storage area may include one or more removable storage mediums. One or more removable storage mediums may include a flash drive, memory card, the like, or a combination thereof.

One or more storage mediums may be in communication with one or more other components. One or more storage mediums may be in communication with one or more data processors, other storage mediums, or both. One or more storage mediums may be directly or indirectly connected to one or more data processors, other storage mediums, or both. A direct connection may include an electrical connection via a common or shared board. An indirect connection may include a network connection. Two or more storage mediums within a single controller may be in direct communication with one another. For example, a temporary storage area may be in communication with a single drive of a controller. As another example, a temporary storage area may be in communication with two separate drives of a controller. Two or more storage mediums may be in communication with one more processors of a controller. For example, a temporary storage area and a single drive may be in communication with a single processor. As another example, a temporary storage area and two drives may be in communication with a single processor. As an even further example, a temporary storage area may be in communication with two separate drives and two processors, with each processor dedicated to executing one or more programs stored on the respective drives.

The control system may include one or more secondary storage mediums. The secondary storage medium may function to receive one or more signals from one or more storage mediums, data processors, or both. The one or more secondary storage mediums may function to receive one or more identified signals from one or more components of a machine. One or more identified signals may include one or more time-stamped signals, one or more component associated signals, or both. One or more identified signals when stored within a storage medium may be referred to as one or more identified entries. One or more identified entries may include one or more time-stamped control entries, one or more time-stamped data entries, or both. The one or more secondary storage mediums may function to receive one or more time-stamped signals in substantially real-time. A secondary storage medium may be advantageous in allowing faster access and/or faster analysis of one or more entries by one or more processors. Faster access and faster analysis may support substantial real-time analysis of one or more entries by one or more processors while allowing for real-time controlling of one or more operations by one or more processors. The use of a secondary storage medium may allow for using one or more primary storage mediums with smaller memory space. A secondary storage medium may be another storage medium in communication with one or more storage mediums of a controller. A secondary storage medium may be located within a controller or outside of a controller. A secondary storage medium may be in direct and/or indirect communication with one or more storage mediums, data processors, or both. The one or more secondary storage mediums may include any of the suitable storage mediums. An exemplary secondary storage medium may include a temporary storage area. For example, a secondary storage medium may include random-access memory of a controller. The one or more secondary storage mediums may be a storage device capable of being transported from one location to another. The one or more secondary storage mediums may employ a same and/or different predefined data structure of one or more databases stored therein as one or more other storage mediums. One or more secondary storage mediums may only store process data over a predetermined period of time. One or more secondary storage mediums may transfer process data outside (e.g., older than) of a predetermined period of time. One or more secondary storage mediums may transfer process data to one or more other storage mediums. The other storage mediums may be located within the same controller, another controller, a server, a removable storage medium, or any combination thereof.

One or more storage mediums may include one or more databases, process data, programs, a combination stored therein. Process data may be stored within one or more storage mediums as one or more data entries. One or more storage mediums may store one or more data entries in a native format, foreign format, or both. One or more storage mediums may store one or more data entries as objects, files, blocks, or a combination thereof. The one or more storage mediums may store one or more data entries within one or more databases.

Database(s)

One or more storage mediums may include one or more databases. The one or more databases may function to receive, store, and/or allow for retrieval of one or more data entries. One or more databases may be located within or be part of hardware, software, or both. One or more databases may be stored on a same or different hardware and/or software as one or more other databases. The databases may be located within one or more non-transient storage mediums. One or more databases may be located in a same or different non-transient storage medium as one or more other databases. The one or more databases may be located within one or more storage mediums. The one or more databases may be accessible by one or more processors to retrieve entries for analysis via one or more programs. The one or more databases may be able to receive, store, and or send one or more entries to one or more other databases, processors, storage mediums, or a combination thereof. The one or more databases may be one or more cloud-based databases. Cloud-based may mean that the one or more databases may reside in a non-transient storage medium located remote from one or more machines, components, and/or processors, local networks, or a combination thereof. One or more cloud-based databases may be accessible via one or more networks. One or more databases may include one or more databases capable of receiving, storing, and/or allowing for retrieval of one or more data entries, time-stamped data entries, time-stamped control entries, the like, or any combination thereof.

The one or more databases may include any type of database able to store digital information. The digital information may be stored within one or more databases in any suitable form using any suitable database management system (DBMS). Exemplary storage forms include relational databases (e.g., structured query language (SQL) database, row-oriented, column-oriented), non-relational databases (e.g., NoSQL database), correlation databases, ordered/unordered flat files, structured files, the like, or any combination thereof. The one or more databases may store one or more classifications of data models. The one or more classifications may include column (e.g., wide column), document, key-value (e.g., key-value cache, key-value store), object, graph, multi-model, or any combination thereof.

The one or more databases may include one or more predefined data structures. A predefined data structure may refer to a database management system, classifications of data models, how data entries are organized, or any combination thereof. A predefined data structure may facilitate organization of one or more data entries within a database, may allow for storage and facilitate subsequent retrieval of machine process data based on one or more identifiers, may allow for comparison and/or relating of one or more data entries to one or more other data entries, or any combination thereof. A predefined data structure of one database may allow for merging with a predefined data structure of another database. A predefined data structure of a secondary storage medium may allow for data stored therein to be easily transferred to a predefined data structure of a separate storage medium. For example, a predefined data structure of a random-access memory of a controller may only retain entries for a predefined period of time at predetermined time intervals and then transfer older entries to a similar predefined data structure within a non-volatile memory of a server via a network. The predefined data structure of the non-volatile memory may allow for retaining of entries over a much larger predefined period of time or until the memory reaches capacity. The predefined data structure may allow for storage of machine process data harvested in substantial real-time. Substantial real-time may mean within about 0.01 milliseconds or greater, about 0.1 milliseconds or greater, or even about 1.0 milliseconds or greater from when a data signal was generated resulting in the data entry. Substantial real-time may mean within about 10 seconds or less, about 1 second or less, about 0.1 second or less, or even about 10 milliseconds or less from when a data signal was generated resulting in the data entry. The predefined data structure may allow for process data harvested over a predetermined period of time. A predetermined period of time may be about 1 second or more, about 5 seconds or more, or even about 10 seconds or more. A predetermined period of time may be about 120 minutes or less, about 90 minutes or less, or even about 60 minutes or less. As the data structure may be part of a secondary storage medium, temporary storage medium, volatile storage medium, or a combination thereof, long durations of time of the data structure may be disadvantageous. If power of a controller is lost, the entries within the data structure of a secondary storage medium may be lost. Thus, one or more secondary storage mediums may be configured to transmit entries to one or other storage mediums within or outside of the controller.

The predefined data structure may allow for organization of the machine process data in real-time. The predefined data structure may allow for one or more data signals, data entries, or both to be easily stored within a database upon being identified with one or more identifiers. For example, a predefined data structure may allow for one or more date entries to be sorted by both a time-stamp and a component identifier. The predefined data structure may include one or more arrays, discrete data points, or any combination thereof. The predefined data structure may include or more array structures. One or more array structures may allow for one or more data entries associated by one or more identifiers to be organized within one or more fields of the array structure. The one or more array structures may include one or more one-dimensional array structures, two-dimensional array structures, three-dimensional array structures, or any combination thereof. One or more array structures may contain the same data entries at successive updates of the one or more control programs. For example, at predefined time intervals the array may include data entries for the same components of machine. Predefined time intervals may be intervals having a substantially same time therebetween or varying time. Predefined intervals may be about equal to or greater than the substantial real-time in which the data is harvested. Predefined time intervals may be time intervals of about 0.01 milliseconds or greater, about 0.1 milliseconds or greater, or even about 1.0 milliseconds or greater. Predefined time intervals may be time intervals of about 10 seconds or less, about 1 second or less, about 0.1 second or less, or even about 10 milliseconds or less. The combination of storing entries over a predetermined period of time and at predefined time intervals may provide an unconventional approach in providing efficient analysis of the data using a processor within the same controller as the storage medium hosting the predefined data server. Inclusion of one or more data entries into one or more predefined data structures may also be initiated by events resulting from one or more control programs being executed. An exemplary array structure may include a two-dimensional array structure. The two-dimensional array structure may position one or more entries within one or more rows and/or columns based on one or more identifiers. For example, a two-dimensional array structure may position one or more entries into a row based on a time-stamp of the entry and position the one or more entries into a column based on a component identifier of the entry. One or more entries may be one or more signals from one or more monitoring devices, components, processors, or combination thereof. Examples of data entries placed into one or more fields of a data structure may include one or more meter values, error statuses, or both related to one or more components of a machine. One or more meter values may include an output voltage, output current, output frequency, component position, part position, scanned value, accelerometer value, the like, or any combination thereof.

A predefined data structure may be outputted as a user viewable database. The user viewable database may allow for a user to view all of the data entries within one or more databases, further analyze the data entries within one or more databases, or both. A predefined data structure may be particularly beneficial for viewing the entries stored therein utilizing one or more operating systems. For example, a second operating system (e.g., Microsoft Windows or Mac), may allow for the entries within the predefined data structure to be organized and viewed within a spreadsheet format on a user viewable interface. A user viewable database may include a user display via a graphic user interface, a user display via a tangible interface, or both. A graphic user interface may include a display provided via a screen of one or more controllers, servers, or other computing device. A tangible interface may include a printed-out version of the user viewable database on paper. The user viewable database may be outputted into a table format in a webpage (e.g., .HTML format), word processor (e.g., .DOC format), spreadsheet (e.g., .XML), the like, or any combination thereof. Thus, the predefined data structure may allow for one or more data entries to be outputted from one or more storage mediums into a tangible interface. By outputting the predefined data structure and entries stored therein into a user viewable database, a user may be able to quickly further identify any relationships between data entries, components, anomalies, the like, or a combination thereof without having to view data related to each component in a separate file. By outputting the predefined data structure and entries stored therein into a user viewable database, the predefined data structure relates all of the data entries based on substantially identical identifiers (e.g., time-stamps, component identifiers) thus eliminating or substantially reducing the need and time for a user to manually reconcile and juxtapose the time occurrences of a variety of signals occurring within one or more machines. The predefined data structure provided on a user viewable interface is significantly advantageous in displaying entries related to a plurality of components over a predetermined time period in a single location, thus allowing a user to immediately view the performance of one or more components during the same time intervals. A predefined data structured presented on a user viewable interface may allow for a user to quickly identify one or more anomalies in entries, one of more fault conditions of one or more components, one or more relationships between components, or a combination thereof. A predefined data structure presented on a user viewable interface may substantially reduce the time for a user to find an anomalous condition of one or more components causing a fault of one or more other components of a machine.

Data Processor(s)

The control system may include one or more data processors. The one or more data processors may function to execute one or more control programs, data analysis modules, or both. Execution of one or more control programs may allow one or more data processors to control one or more operations of one or more components of a machine. Execution of one or more data analysis modules may allow one or more data processors to analyze one or more entries within one or more storage mediums of a machine in substantial real-time; identify and/or automatically inform of one or more anomalies related to the operation of a machine in substantial real-time, schedule maintenance related to the one or more anomalies; or any combination thereof. One or more control programs, data analysis modules, or both may instruct one or more processors to apply one or more identifiers to one or more signals up receipt and/or transmission from the same data processor.

The one or more data processors may function to control one or more operations of one or more components of a machine, receive one or more signals from one or more components, identify a plurality of signals (e.g., time-stamp, component identifier), process data, retrieve and/or execute one or more control programs and/or data analysis modules, or any combination thereof. Processing data may include receiving, transforming, outputting, executing, the like, or a combination thereof. The one or more processors may be in communication with one or more storage mediums to allow for transmission and/or retrieval of one or more entries from a storage medium. One or more processors may be part of one or more hardware, software, systems, or any combination thereof. One or more hardware processors may include one or more central processing units, multi-core processors, front-end processors, the like, or any combination thereof. One or more servers, controllers, or both may include a single processor, a plurality of processors, or both. A single processor of a controller or a plurality of processors of a controller may execute one or more control programs and/or data analysis modules stored on a single storage medium (e.g., drive with a single or multiple operating systems) or a plurality of storage mediums (e.g., separate drives with separate operating systems).

One or more software processors may include one or more word processors, document processors, the like, or any combination thereof. One or more system processors may include one or more information processors, the like, or a combination thereof. The one or more data processors may include a single processor or a plurality of processors. The one or more data processors may be included in a single central processing unit. The one or more data processors may be in electrical communication with one or more machines, components, other data processors, monitoring devices, storage mediums, or a combination thereof. The one or more processors may be located within a same and/or different non-transient storage medium as one or more storage mediums, other processors, network interfaces, communication modules, communication hubs, or any combination thereof. The one or more data processors may control operations of one or more components. One or more data processors may be configured to access one or more control programs. One or more data processors may be in communication (e.g., electronic communication) with and/or include one or more storage mediums. One or more data processors may be able to retrieve one or more control programs, data analysis modules, or both from one or more storage mediums. One or more data processors may be able to execute one or more control programs, data analysis modules, or both. Execution of one or more control programs may result in execution of one or more operations of one or more components. One or more components may include a single component or a plurality of components. A plurality of components may include two or more, three or more, four or more, five or more, or even ten or more components. Execution of one or more control programs, data analysis modules, or both may result in one or more signals (e.g., control signals, data signals) being stored within one or more storage mediums as one or more entries (e.g., control entries, data entries). Execution of one or more control programs, data analysis modules, or both may result in one or more control signals, data signals, or both being identified with one or more identifiers (e.g., time-stamp, component identifier), converted into one or more entries, or both. For example, execution of a control program and/or data analysis module may instruct a data processor to identify a control signal with a component identifier and/or a time-stamp (e.g., time control signal is transmitted from processor) and then converting and storing the control signal as a control entry within a secondary storage medium of a same controller in which the processor is located. For example, execution of a control program and/or data analysis module may instruct a data processor to identify a data signal with a component identifier and a time-stamp and then converting and storing the data signal as a data entry within a secondary storage medium of the same controller in which the processor is located.

The one or more data processors may be configured to identify one or more signals with one or more identifiers. The one or more identifiers may function to allow the one or more signals to be stored and sorted within a database as one or more entries. The one or more identifiers may include one or more component identifiers, time-stamps, or both. A component identifier may identify a signal based on what component the signal has been generated from, what component the signal has been transmitted to, or both. A time-stamp identifier may identify a signal based on what time a signal is received within the processor, transmitted from a processor, or both. The one or more signals may include one or more control signals, one or more data signals, or both. One or more signals may include a single signal or a plurality of signals. The one or more data processors may be configured to retrieve, analyze, or both one or more signals. The one or more signals may include identified control entries, identified data entries, or both. An identified control entry, identified data entry, or both may be associated with a component identifier, time-stamp, or both. A control entry associated with at least a time-stamp may be referred to as a time-stamped control entry. A data entry associated with at least a time-stamp may be referred to as a time-stamped data entry.

The one or more processors may be configured to transmit and/or receive one or more signals, entries, or both over a period of time from one or more storage mediums. The period of time may be a predetermined period of time. The one or more data processors may be configured to receive and/or relay signals (including time-stamped data signals) as a generally continuous stream of data, at predetermined time-intervals, upon one or more operating conditions being sensed by one or more monitoring devices, at random times, or any combination thereof. The one or more data processors may retrieve, analyze, or both one or more data signals from a machine while the machine is actively operating, at rest, or both. One or more data processors may be configured to receive one or more signals from one or more monitoring devices.

Monitoring Device(s)

The control system may include one or more monitoring devices (e.g., sensing devices). The monitoring devices may function to sense one or more operating conditions, relay one or more signals related to one or more operating conditions, or both. The one or more monitoring devices may include any device capable of sensing one or more operating conditions, relaying one or more signals related to one or more operating conditions, or both. The one or more monitoring devices may sense the one or more operating conditions before, after, and/or simultaneous with one or more other conditions or actions. The one or more monitoring devices may be in communication with one or more data processors. The one or more monitoring devices may transmit one or more data signals to one or more data processors. The one or more data signals may be one or more signals related to the one or more operating conditions sensed by the one or more monitoring devices. The one or more monitoring devices may sense one or more operating conditions substantially continuously, substantially discontinuous, upon one or more operating conditions occurring, at random time intervals, at pre-set time intervals, or any combination thereof. Substantially continuous may be a time frequency in which gaps smaller than a period in which one or more fault or anomalous conditions may occur within a machine. The monitoring devices may sense one or more operating conditions at time intervals smaller than or substantially equal to predetermined time intervals of storing entries within one or more storage mediums. The storage medium may include a predefined data structure within secondary storage medium of a controller. Pre-set time intervals may be about every 0.01 milliseconds or greater, about every 0.01 milliseconds or greater, or even about every 0.1 milliseconds or greater. Pre-set time intervals may be about every 10 seconds or less, about 5 seconds or less, about 2 seconds or less, about every 1 second or less, or even about every 10 milliseconds or less.

One or more monitoring devices may be one or more components of a machine. One or more components of the machine may include the one or more components a processor is controlling via one or more control programs, one or more components sensing one or more conditions of one or more other components, or both. One or more monitoring devices may be an active component in a machine or a passive component of a machine. An active component of a machine may be configured to execute an operation upon instruction from a control program. A passive component of a machine may be configured to relay signals between components but not execute an operation. Examples of an active component of a machine may include one or more motors, gears, inverters, robotic end effectors, conveyance systems, scanners, extruders, the like, or a combination thereof. Examples of monitoring devices include, but are not limited to meters, touch sensors, force sensors, vision sensors, proximity sensors, heat sensors, chemical sensors, light sensors, sound sensors, position sensors, velocity sensors, accelerometers, busbar, relay switch, the like, or any combination thereof.

Machine Process Data

The control system may generate machine process data during operation of one or more components, analysis of one or more entries within a storage medium, the like, or a combination thereof.

One or more data processors of the control system may transmit one or more signals, identify one or more signals, transmit one or more identifies signals, receive one or more identified signals, analyze one or more identified signals, or any combination thereof. The one or more data processors may control operation of one or more components (e.g., two or more) by transmitting one or more control signals. The one or more data processors may receive data from one or more components. Data from one component to another or a data processor may be transmitted in the form of one or more data signals. One or more data processors may receive data from one or more components in the form of one or more data signals. The data signals may correspond to one or more operating conditions in real-time. The data signals may be relayed from one or more monitoring devices and/or components to the one or more data processors. The one or more data processors may time-stamp the one or more control signals, data signals, or both. The one or more control signals may be time-stamped at the time of transmission from the one or more data processors. The one or more data signals may be time-stamped at the time of receipt by the one or more data processors. Time-stamping may refer to a digital time-stamp. Time-stamping may include associating a date, time, sequential number, the like, or a combination thereof to a signal upon receipt and/or transmission from a processor. Upon being time-stamped, the one or more control signals may be referred to as one or more time-stamped control signals. Upon being time-stamped, the one or more data signals may be referred to as one or more time-stamped data signals. As one or more control signals are relayed to the one or more components, the one or more time-stamped control signals may be transmitted to one or more storage mediums. For example, at the time one or more control signals may be relayed to one or more components to initiate one or more operating conditions, one or more time-stamped control signals may be transmitted to one or more storage mediums. After time-stamping one or more incoming data signals, the one or more time-stamped data signals may be transmitted to one or more storage mediums. The transmission of the time-stamped control signals and/or data signals to the storage medium may provide for harvesting of real-time process data of the machine. Upon receipt of the one or more time-stamped control signals and/or time-stamped data signals within one or more storage mediums, the signals may be stored as one or more time-stamped control entries, one or more time-stamped data entries, or both.

Control Program(s)

The control system may include one or more control programs. The one or more control programs may function to instruct one or more data processors to execute, initiate, pause, stop, or any combination thereof one or more operations of one or more components of a machine.

The one or more control programs may be stored within one or more storage mediums. The one or more control programs may be stored within a storage medium of a controller. One or more control programs may be stored within a drive of a controller. One or more control programs may include a single or a plurality of control programs. A control program may be dedicated to the operation of a single component or a plurality of components of a single machine or a plurality of machines. The one or more control programs may be configured to instruct one or more data processors to initiate, pause, stop, or a combination thereof one or more operations of one or more robotic machines. One or more operations of one or more robotic machines may include welding, assembly, machine tending, material handling, material removal, part transfer, kitting, forming and processing, painting, coating, sealing, finishing, part inspection, labeling (e.g., laser marking, sticker labeling), spraying, the like, or any combination thereof. The one or more control programs may be configured to instruct one or more processors to initiate, pause, stop, or a combination thereof one or more operations of a machine based upon one or more data signals received by a data processor from a component. For example, a data signal may identify an anomaly or fault condition instantaneously without the need for further analysis by a processor executing one or more data analysis modules. An anomaly or fault condition may be programmed within a control program, such that a processor substantially immediately in real-time recognizes the anomaly or fault condition of a component while executing a control program.

The one or more control programs may be stored in a same or a different storage medium of a controller as one or more data analysis modules. For example, a plurality of control programs may be stored within a portion of a drive which hosts a first operating system while a plurality of data analysis modules are stored within a separate portion of a drive which hosts a second operating system. For example, a control program may be located in a first storage medium having a separate operating system as a second storage medium having one or more data analysis modules stored therein. The one or more control programs may be accessible and executable by one or more data processors. The one or more data processors may be a single or a plurality of data processors located within the same controller as a storage medium having the control program stored therein. The one or more control programs may include one or more instructions which instruct one or more processors to collect, identify, and/or transmit one or more control signals related to one or more operating conditions of a component to a storage medium. The storage medium may be a secondary storage medium within a controller, separate from the storage medium hosting the control program.

Data Analysis Module(s)

The control system may include and/or be in communication with one or more data analysis modules. The one or more data analysis modules may function to cooperate with one or more data processors, storage mediums, or both to analyze a plurality of entries. By defining a data structure (e.g., predefined data structure) of the one or more storage mediums, data analysis modules may be employed which utilize the standard data structure. By defining a data structure, a data analysis module hosted on one operating system may be able to use data gathered during the use of another operating system. By defining a data structure, a data analysis module on one operating system is able to instruct a processor to analyze data at substantially the same time to gathering the data via another operating system with the same processor. One or more data analysis modules may be part of the control system; separate from the control system; removable from the control system; insertable into the control system; separate from or with one or more control programs and/or other data analysis modules (e.g., location in same or different processors having the programs/modules residing therein); developed separately from or in conjunction with one or more control program and/or other data analysis modules; or any combination thereof. The data analysis modules may be authored on-site at the facility in which the control system is located, off-site based on the predefined data structure, or during development of the control program to be employed with the machine. The data analysis modules may be located within one or more processors, storage mediums, or both. The one or more processors may be the same or a different processor which control operation of one or more components. For example, one or more data processors which control operation of one or more components by executing one or more control programs may also execute the one or more data analysis modules. As another example, one or more data processors executing one or more data analysis modules may be separate from one or more data processors executing one or more control programs. If one or more data processors executing one or more data analysis modules is separate from one or more data processors executing one or more control program, the data processors may be in communication via a network or a common backplane connection.

The one or more data analysis modules may be part of a same or separate operating system as one or more control programs. For example, one or more data analysis modules may be part of a Windows Embedded Compact operating system of a controller, while a Linux operating system of the same controller controls operation of the one or more components (e.g., includes the executable control program therein). As another example, one or more data analysis modules may be part of a Windows operating system of a remote controller and processor in communication with a storage medium and in communication with a data processor which controls operation of one or more components of a machine and in communication with the same storage medium.

The one or more data analysis modules may allow for any suitable analysis to be formed based on the entries stored within one or more storage mediums. The one or more data analysis modules may allow for custom algorithms to be written to analyze the entries within the one or more storage mediums. The one on more data analysis modules may relay the real-time harvested process data to one or more other storage mediums.

The scope of the data analysis module may not be restricted and can encompass any type of analysis or data handling/compression thought pertinent to the process. Data analysis modules may be compartmentalized programs that take the machine process data to determine the current status and trends of the machine. By determining a current status and trends of a machine, a high level of predictive maintenance of the machine may be achieved. For instance, looking at the power consumed during repetitive transfer cycles, a long-term trend of consuming more power than expected may indicate a bearing or other mechanical device is starting to fail. The scope of the Data Analysis Module is only limited by the imagination and ingenuity of a programmer. Data analysis modules could be changed dynamically by a server or other overseeing device in the system. For instance, a Data Analysis Module may catch a cycle time increasing over the 100 transfer cycles. The overseeing device or server (e.g., data processor) could load a more detailed Data Analysis Module for a deeper dive into the cause of the cycle time variance. The data analysis modules may be programmed with one or more data analysis algorithms, load control modules, or both. A single or a plurality of data analysis algorithms may be stored within a single data analysis module.

Data Analysis Algorithms

One or more data analysis modules may include one or more algorithms stored therein. The one or more algorithms may function to identify (e.g., detect) one or more anomalous conditions and/or faults in the machine. The one or more data analysis algorithms may function to determine an interdependence between one or more of the time-stamped control entries and one or more of the time-stamped data entries, between two or more of the time-stamped control entries, between two or more of the time-stamped data entries, or any combination thereof. The one or more algorithms may calculate one or more trends of one or more signals and/or entries (e.g., time-stamped data entries, time-stamped control entries, or both). The one or more algorithms may calculate one or more trends of and/or over a period of time. The period of time may be predetermined or determined by the one or more algorithms. The period of time may be the predetermined period of time entries are stored within a storage medium. For example, the period of time may be the same predetermined period of time entries are stored within a database having a predefined data structure of a random-access memory of a controller. The one or more algorithms may be configured to identify one or more signals or data entries deviating from one or more trends. The one or more algorithms may be configured to be continuously executed by one or more processors while a machine and/or one or more components of a machine are in operation. The one or more algorithms may be configured to continuously be executed based on the continuously updated entries within a database of a storage medium (e.g., random access memory). One or more data entries deviating from one or more trends may be identified as one or more anomalous conditions, fault conditions, or both. Exemplary data analysis algorithms may include one or more Fourier Transform algorithms, oscilloscope algorithms, cycle time algorithms, fault algorithms, deviation algorithms, the like, or any combination thereof.

A data analysis algorithm may include one or more Fourier Transform algorithms. A Fourier Transform may function to visualize and display one or more signals, entries, or both as frequencies of one or more waves. By displaying a plurality of entries within a database as one or more waves, it may be simple to identify one or more anomalous conditions of a wave. One or more anomalous conditions may include a sudden change in frequency, wavelength, cycle, speed, amplitude, crest height, trough height, or a combination thereof of a wave. A Fourier Transform algorithm may instruct one or more processors to identify one or more anomalous conditions of a wave calculated by a processor using a Fourier Transform Algorithm. A Fourier Transform Algorithm may function to convert one or more entries stored within a database into one or more frequencies. Fourier Transform Algorithm may be configured to instruct one or more processors to decompose one or more entries stored within a database into one or more frequencies. The Fourier Transform Algorithm may be configured to instruct one or more processors to decompose one or more entries as a function of time. The Fourier Transform Algorithm may decompose entries stored within a database as a function of time based upon an associated time-stamp of an entry and/or time identifier of an array in which the entry is stored. The associated time-stamps of the entries or time identifiers of a plurality of arrays may form a time domain of the Fourier transform. Exemplary Fourier Transforms may be found in Fourier Transforms by Ian Sneddon and published in 1995, The Fourier Transform and Its Applications by Ronald Newbold Bracewell and published in 2000, and Fourier Transform published on Wikipedia®, all of which are incorporated herein in their entirety for all purposes. A Fourier Transform algorithm may be a Fast Fourier Transform (FFT) algorithm. A Fast Fourier Transform (FFT) may be configured to instruct one or more processors to compute a Discrete Fourier Transform (DFT), an Inverse Fast Fourier Transform (IFFT), or both of a plurality of entries stored within a database. Faster Fourier Transform is discussed within Fast Fourier Transform— Algorithms and Applications by K. R. Rao, et. al. as published in 2011, incorporated herein by reference in its entirety for all purposes.

A data analysis algorithm may include one or more oscilloscope algorithms. An oscilloscope algorithm may function to observe and compare values of one or more signals as a function of time. An oscilloscope algorithm may be configured to instruct one or more processors to convert one or more entries stored within a database into a two-dimensional plot of the one or more entries as a function of time. The two-dimensional plot may have the one or more entries plotted as one or more waves as a function of time. An oscilloscope algorithm may instruct one or more processors to plot one or more voltage outputs stored within ad database as a function of time. An oscilloscope algorithm may be configured to convert one or more entries which are not voltage outputs into one or more voltage outputs. The oscilloscope algorithm may be configured to instruct one or more processors to calculate one or more properties of the one or more waves. One or more properties may include amplitude, frequency, rise time, time interval, distortion, and the like. The oscilloscope algorithm may be configured to instruct the one or more processors to calculate one or more trends of the one or more properties of the one or more waves. The oscilloscope algorithm may be configured to instruct the one or more processors to identify one or more properties which deviate from a trend as an anomalous condition. The one or more oscilloscope algorithms may be beneficial as the algorithm allow for signals to be represented as a function of time without the use of a separate oscilloscope as part of the control system. Further detail about oscilloscopes can be found in Oscilloscopes: How to Use Them, How They Work written by Ian Hickman and published in 2001.

A data analysis algorithm may include one or more cycle time algorithms. A cycle time algorithm may function to instruct one or more processors to calculate and/or compare one or more cycle times of one or more operations of one or more components. A cycle time algorithm may identify if a cycle time is taking longer and/or shorter than anticipated. An anticipated cycle time may be an average cycle time or predetermined cycle time. A cycle time may be defined as the time between the start of an operating condition of a component and the end of an operating condition of a component, between the start of an operating condition of a component and the next start of the same operating condition of the component, or both. The cycle time algorithm may instruct one or more processors to calculate the time between one or more entries designating the start and/or end of an operating condition within a database. The cycle time algorithm may instruct one or more processors to calculate an average cycle time of a plurality of entries stored within a database. The average cycle time may be a moving average cycle time as one or more new entries stored within the database and one more older entries are transferred to another storage medium or disposed of. An exemplary cycle time may be calculated as the time between peak output voltage entries for a component recorded within the database. An exemplary cycle time may be calculated as the time between an initial increase in output voltage entry and the subsequent decrease in output voltage entry of a component.

A data analysis algorithm may include one or more fault algorithms. A fault algorithm may function to instruct one or more processors to identify one or more faults based on one or more predetermined fault values. A fault algorithm may have one or more values stored therein which are one or more predetermined fault values. One or more predetermined fault values may be one or more values of one or more entries which indicate a component related to that entry is malfunctioning. One or more predetermined fault values may be identified as one or more currents, voltages, frequencies, other measurements, error statuses, or any combination thereof which indicate a component of a machine is malfunctioning. The one or more fault algorithms may instruct one or more processors to compare one or more entries of a database to one or more related predetermined fault values. The one or more fault algorithms may instruct one or more processors to identify a fault condition if one or more entries of a database are below, equal to, or greater than one or more predetermined fault values.

Processor Load Control

The control system may include one or more processor load control features. The one or more processor load control features may allow for optimizing utilization of one or more processors. The one or more processor load control features may allow for optimizing utilization one or more processors while executing one or more control programs, data analysis modules, or both. The one or more process load control features may control the load on a Central Processing Unit (CPU). For example, if the same data processor has a large number of data analysis modules running while simultaneously controlling operation of one or more components of a machine, utilization of the processor may become too high (e.g. over 50%, over 75%, over 95%), or may even become overloaded (e.g., attempt to utilize processor above 100%). If the data processor utilization becomes too high or overloaded, function of the control system and/or machine may be compromised. The one or more processor load control features may function by indicating when a control program processor load is increasing, over a certain utilization percentage, or both. The one or more processor load control features may communicate load use of a processor to one or more data analysis modules of the same or a different processor. A data analysis module may reduce an amount of processor resources being consumed upon receipt of a load use, such as a load use over a certain percent utilization. Methods for reducing processor load may include, but are not limited to, activation of an idle mode in one or more data analysis modules, reduced algorithm (e.g., code) execution, the like, or any combination thereof. The one or more processor load control features may be advantageous in allowing the control system to utilize the available resources in a fashion so as to not impact the control of the machine and operation of one or more components due to one or more Data Analysis Modules utilizing too much space in one or more processors. By monitoring the utilization load or by monitoring flags set by the control program, one or more Data Analysis Modules can suspend their execution (e.g., operation) by the processor, reduce the frequency with which the data analysis modules execute or reduce the scope of algorithms they execute. For example, a data analysis module may instruct a data processor to execute three or more data analysis algorithms during periods of low processor utilization by one or more control programs and instruct a data processor to execute only one or two data analysis algorithms during periods of high processor utilization during execution of one or more control programs. By doing this, more processor resources are made available to the control system to allow proper control of the machine. One or more sources for the one or more load control features may include another data analysis module, a separate control program, or both. For example, a control program which instructs one or more processors to control one or more components also instructs the processor to flag (e.g., identify) periods of high load utilization (e.g., intense computation). As another example, a processor load control feature may be a program within one or more operating systems which may indicate actual processor utilization, utilization over a certain percent utilization, the like, or any combination thereof. The control system may temporarily pause identifying (e.g., time-stamping, component identifying), sensing, storing, and/or retrieving a plurality of data signals and/or time-stamped data entries to maintain speed of one or more data processors. This temporary pausing may be referred to as load control. The load control may be particularly useful in the case where the data processor is a single central processing unit.

Network

The control system may include or be integrated into one or more networks. The one or more networks may be formed by placing one or more machines, components, processors, storage mediums, and the like, of one or more control systems in electrical communication with one another. One or more network interfaces may be incorporated into one or more servers, controllers, other computing devices, or any combination thereof to allow the devices to connect to a network. One or more networks may include or be free of one or more communication hubs. One or more components, processors, storage mediums, servers, controllers, other computing devices, the like, or any combination thereof may be directly connected to one another without the use of a communication hub or in communication with one another via a communication hub. One or more networks may be connected to one or more other networks. One or more networks may include one or more local area networks (LAN), wide area networks (WAN), intranet, Internet, industrial Ethernet, the like, or any combination thereof. The network may be temporarily, semi-permanently, or permanently connected to one or more machines, components, processors, storage mediums, servers, controllers, computing devices, the like, or a combination thereof. A network may allow for one or more components, processors, storage mediums, or combination thereof to transmit and/or receive one or more signals, entries, or both. The network may allow for one or more signals from one or more components, data processors, storage mediums, servers, controllers, computing devices, the like, or a combination thereof to be relayed through the system to one or more other components, data processors, storage mediums, servers, controllers, computing devices, the like, or any combination thereof. The network may allow for one or more processors and/or storage mediums to receive one or more data entries from and/or transmit one or more data entries to one or more other processors and/or storage mediums.

The control system may include or be free of a communication hub. A communication hub may function to receive one or more signals, transfer one or more signals, or both from one or more components, processors, storage mediums, servers, controllers, computing devices, the like, or any combination thereof. The communication hub may be any type of communication hub capable of sending and transmitting data signals over a network to one or a plurality of components, processors, storage mediums, servers, controllers, the like, or combination thereof. The communication hub may include a wired router, a wireless router, or both. The communication hub may be connected to one or more components, processors, storage mediums, servers, controllers, computing devices, or combination thereof via a wired connection, wireless connection, or a combination of both.

Exemplary Overall Control System Architecture and Advantages

Based on the teachings disclosed herein, it can be understood that an exemplary embodiment of the control system may include a data processor both controlling one or more components of a machine while also harvesting real-time process data of the machine. One or more control programs may reside within the data processor which are executed to control operation of one or more components. The control program is executed so that the data processor relays a control signal to a component to result in operation of that component. The data processor also time-stamps that control signal and relays the time-stamped control signal to a storage medium, such as a temporary storage medium. The control system also includes one or more monitoring devices within the system which monitor or sense a number of conditions within the machine. These monitoring devices transmit data signals to the data processor. The data processor time-stamps these data signals and transmits the time-stamped data signals to the storage medium.

In the storage medium, the time-stamped control and data signals are stored as time-stamped control and data entries. A predefined data structure determines how the entries are stored within the storage medium. In an array format, the entries for a particular time interval of retrieval are stored within one row of the database, each entry within a different cell or field of that row.

One or more data analysis modules can be stored on the same or different data processor as the one or more control programs. These data analysis modules are an executable program separate from the control program. By having the data analysis modules separate from the control program, the control program is relieved of the burden to process and analyze the data in the data structure. Further, the data analysis modules can be added or removed from the control system based on different analysis needed at different times, as the system grows, the machine is upgraded, etc. The methodology for data analysis is not restricted to this embodiment. While it is possible to have a high intensity, single processor execute both control programs and all of the data analysis modules, one or more load control features may allow the single processor to execute all of these programming while preventing over-utilization (e.g., crashing) or reduced performance of the processor.

Method of Operation

The disclosure further relates to a method of operating a machine of the disclosure. The method may include operating a machine having one or more components. One or more components may include two or more components. The method may include operating the machine with a control system. The method may include a) controlling one or more operations of each of the two or more components of the machine using a data processor with a plurality of control signals; b) time-stamping the control signals with the data processor to form time-stamped control entries corresponding with the plurality of control signals; c) storing the time-stamped control entries for subsequent retrieval in a storage medium; d) sensing a plurality of operating conditions of each of the two or more components of the machine with two or more monitoring devices, wherein the sensing is substantially simultaneous with the controlling step and at a predetermined condition frequency, and wherein the two or more monitoring devices communicate by transmitting data signals corresponding to the plurality of operating conditions substantially in real-time to the data processor; e) time-stamping the data signals with the data processor to form time-stamped data entries corresponding with the data signals; f) storing the time-stamped data entries for subsequent retrieval in the storage medium. The method of the disclosure may further include filtering one or more time-stamped control entries, time-stamped data entries, or both prior to storing based upon one or more identification filters; sequencing one or more time-stamped control entries, time-stamped data entries, or both within one or more databases based upon an associated time-stamp, component identifier, or both; retrieving and automatically analyzing one or more time-stamped data entries, time-stamped control entries, or both from a storage medium using a data processor; automatically identifying one or more anomalous conditions of a machine using a data processor; automatically informing a user of one or more anomalous conditions of a machine via a user interface; and/or automatically schedule predictive maintenance or service to be performed upon a machine based on an occurrence or detection of one or more anomalous conditions.

Controlling Operation of Component(s)

The method of operating a machine may include controlling one or more operations. Controlling the one or more operations may function to initiate, alter, or stop one or more operating conditions. The one or more operating conditions may include one or more operating conditions of one or more components. The method may include controlling one or more operations of one or more components or a plurality of components of a machine. A plurality of components may include two or more, three or more, four or more, or even ten or more components. The step of controlling one or more operations of one or more components may be caused by one or more data processors, control programs, or both. A processor may access one or more control programs from one or more storage mediums. The processor, storage medium, or both may be located within the same controller. One or more control program may be stored within a storage medium having a first operating system. For example, a processor may retrieve one or more control programs from a storage medium hosting a first operating system of a controller. One or more control programs may instruct one or more data processors to initiate one or more operating conditions of one or more components. Upon execution of one or more control programs, one or more data processors may transmit one or more control signals. Retrieval of one or more instructions from a control program by a processor followed by transmission of one or more control signals to one or more components of a machine may be referred to as a fetch-execute cycle. One or more control signals may be a single or a plurality of control signals. A plurality of control signals may include two or more, three or more, four or more, or even ten or more components. A plurality of control signals may be less than, equal to, or greater than a number of components within a machine. Controlling one or more operations of each of two or more components of a machine include the data processor transmitting a plurality of control signals to the two or more components. Upon transmitting one or more of the control signals, the processor may identify one or more of the control signals.

Upon receipt of one or more control signals, one or more components may execute one or more operations. Execution of an operation may function for the machine, component, or both to achieve a manufacturing task. A control signal may be received by a processor located within a component, separate from a processor within a controller. A control signal may be received within an inverter of a machine. An inverter may be a component of a machine. An inverter may be a current inverter, frequency inverter, the like, or a combination thereof. For example, one or more processors may be located internally within one or more components of a machine. For example, a robotic arm, scanner, welding head, and the like may include an internal processor in communication with a processor of a controller. Upon receipt of a control signal, one or more components may execute one or more operations. The one or more operations may be any operation suitable to be completed by a robotic machine. The one or more operations may include welding, part assembly, machine tending, material handling, material removal, part transfer, kitting, forming and processing, painting, coating, sealing, extruding, finishing, part inspection, labeling (e.g., laser marking, sticker labeling), spraying, the like, or any combination thereof. For example, upon receipt of a plurality of control signals from a single processor within a controller to a plurality of processors within a plurality of welding heads, a plurality of welding heads may form multiple welds on an automotive body. For further example, upon receipt of a control signal from a processor within a controller to an inverter tied to a motor of a pulley system, a motor may be actuated to rotate the pulley system and thus moving an associated conveyor belt. As another example, upon receipt of a control signal from a processor within a controller, an extrusion head may extrude one or more materials.

Sensing Operating Condition(s) in Machine

The method may include sensing one or more operating conditions. Sensing one or more operating conditions may allow for one or more anomalous conditions to be detected; detecting and storing of one or more data entries related to one or more data signals related to one or more operating conditions; controlling one or more other operating conditions based on the sensed operating conditions; or any combination thereof. One or more operating conditions may be related to one or more components of the machine. For example, the method may include sensing a plurality of operating conditions of each of two or more components of the machine. One or more monitoring devices, components, or both may automatically detect the one or more operating conditions. Each monitoring device within the machine may be dedicated to detecting a single or a plurality of operating conditions. For example, two or more monitoring devices may detect a plurality of operating conditions of each of two or more components of a machine.

Exemplary sensing operations by one or more monitoring devices may include one or more of the following. Sensing of an operating condition may include measuring one or more values of one or more conditions with one or more meters. Sensing of an operating condition may include detecting the presence of touch, force, and/or pressure via one or more touch sensors. Sensing of an operating condition may include measuring the amount of force and/or pressure exerted by or on a component by one or more force sensors. Sensing of an operating condition may include determining a presence, orientation, and/or accuracy of one or more parts and/or components by a vision sensor. Sensing of an operating condition may include capturing one or more images via one or more vision sensors, cameras, other imaging devices, or combination thereof. Sensing of an operating condition may include detecting the presence of a nearby object, part, and/or component (e.g., without physical contact) with one or more proximity sensors. Sensing of an operating condition may include detecting one or temperatures with one or more heat sensors. Sensing of an operating condition may include detecting a composition, presence of an element or ion, detecting a concentration, detecting chemical activity, and/or the like with one or more chemical sensors. Sensing of an operating condition may include detect an ambient light level with one or more light sensors. Sensing of an operating condition may include detecting a sound (e.g., ambient sound) using one or more sound sensors. Sensing of an operating condition may include detecting one or more positions of one or more parts, objects, and/or components with one or more position sensors. Sensing of an operating condition may include detecting and/or measuring a speed of movement of one or more parts, objects, and/or components using one or more velocity sensors. Sensing of an operating condition may include detecting and/or measuring acceleration of one or more parts, objects, and/or components using one or more accelerometers. Sensing of an operating condition may include detecting the presence or absence of an electrical signal, such as detection by one or more busbars, relay switches, or combination thereof. Upon sensing of one or more operating conditions, one or more components, monitoring devices, or both may transfer a data signal to a processor related to the operating condition. One or more control programs, data analysis modules, or both may instruct one or more components, monitoring devices, or both to transmit the one or more data signals to a processor. The processor may be one or more processors within the same controller as the processor executing the one or more control programs.

Identifying One or More Signal(s)

The method of operating a machine may include identifying one or more signals. Identifying one or more signals may function to identify which component, operating condition, and/or time a signal is related to. Identifying one or more signals may include time-stamping one or more signals, adding one or more component identifiers to one or more signals, adding one or more operating condition identifiers, or any combination thereof to the signal. Identifying one or more signals may occur upon transmission from and/or receipt by one or more processors. Identifying one or more signals may occur by one or more processors executing one or more control programs, data analysis modules, or both. Identifying one or more signals may occur by one or more processors located within a same controller as one or more storage mediums hosting one or more control programs, data analysis modules, or both. One or more control programs, data analysis modules, or both may instruct one or more processors to identify one or more signals upon transmission, receipt, or both by the processor.

The method of operating a machine may include time-stamping one or more signals. Time-stamping one or more signals may function to identify, filter, organize, sequence, and/or store one or more signals, data entries, or both. Time-stamping a signal may include adding information to the signal related to a date, time, or both the signal is received, transmitted, or both from a processor. Time-stamping one or more signals may include time-stamping one or more signals upon receipt, transmission, or both from one or more processors. Time-stamping one or more signals may include time-stamping one or more control signals, data signals, or both. Upon time-stamping one or more signals, the one or more signals may be referred to as one or more time-stamped signals. Upon being time-stamped, one or more time-stamped signals may be transmitted to one or more storage mediums. Upon being time-stamped, one or more time-stamped signals may be transmitted to a secondary storage medium by a processor. The secondary storage medium may be located within the same controller having the processor, storage medium, or both therein. The secondary storage medium may be a random-access memory of a controller. The one or more time-stamped signals may be referred to as one or more time-stamped entries when located within a storage medium. For example, a processor within a controller which transmits a control signal to a component based on instruction of a control program stored within a storage medium (e.g., drive) of the control may time-stamp the control signal and also transmit the time-stamped control signal to a secondary storage medium (e.g., random access memory) located within the same controller. As another example, a processor within a controller which receives a data signal from a monitoring device may time-stamp the data signal and then transmit the time-stamped data signal to a secondary storage medium located within the same controller.

The method of operating a machine may include adding one or more component identifiers to one or more signals. A component identifier of one or more signals may function to identify, filter, organize, sequence, and/or store one or more signals, entries, or both. Adding a component identifier may include adding information to a signal related to a component from which the signal was received, a component to which the signal is being transmitted, or both with a processor. Adding a component identifier to a signal may be upon receipt, transmission, or both from one or more processors. Adding a component identifier to one or more signals may include identifying one or more control signals, data signals, or both with a component identifier. Upon adding a component identifier to a signal, the signal may be referred to as a component associated signal. A signal may be associated with a component identifier simultaneously or asynchronously as being time-stamped, or may not also be time-stamped. Upon being associated with a component, one or more component associated signals may be transmitted to one or more storage mediums. Upon being identified with a component, one or more component associated signals may be transmitted to a secondary storage medium by a processor. The secondary storage medium may be located within the same controller having the processor, storage medium, or both therein. The secondary storage medium may be a random-access memory of a controller. The one or more component associated signals may be referred to as one or more component associated entries when located within a storage medium. A component associated entry may be the same as a time-stamped entry if the entry includes both component and time-stamp information. For example, a processor within a controller which transmits a control signal to a component based on instruction of a control program stored within a storage medium (e.g., drive) of the control may identify the control signal with the component the signal is being transmitted and also transmit the component associated control signal to a secondary storage medium (e.g., random access memory) located within the same controller. As another example, a processor within a controller which receives a data signal from a monitoring device may associate the data signal with the monitoring device the data signal was received from and then transmit the component associated data signal to a secondary storage medium located within the same controller.

Storing Entries Within Storage Medium(s)

The method may include storing one or more entries. Storing one or more entries may allow for analysis of one or more entries using one or more data analysis modules, use of one or more entries to execute one or more control programs, or both. The one or more entries may include one or more identified entries. One or more identified entries may include one or more identified control entries, identified data entries, or both. One or more identified control entries may include one or more time-stamped control entries, component associated entries, or both. One or more identified data entries may include one or more time-stamped data entries, component associated data entries, or both.

The one or more entries may be stored within one or more databases of a storage medium. The one or more entries may be stored within a database having a predetermined database structure within a storage medium. The one or more entries may be stored within a database of a secondary storage medium. For example, the one or more entries may be stored within a database of a random-access memory of a controller.

Storing one or more entries within a storage medium may include filtering the one or more identified entries based on one or more identification filters. The one or more identification filters may include one or more component filters, one or more time-stamp filters, or both. One or more component filters may function to distinguish one or more entries from one or more other entries based on one or more component identifiers, sort one or more entries based one or more component identifiers, or both. The one or more component filters may function to store one or more entries in one or more fields of one or more arrays based on a component identifier. One or more time-stamp filters may function to distinguish one or more entries from one or more other entries based on one or more time-stamp identifiers, sort one or more entries based on one or more time-stamp identifiers, or both. The one or more time-stamp filters may function to store one or more entries in one or more fields of one or more arrays based on a time-stamp identifier.

A plurality of identification filters may be used simultaneously to sort and store a plurality of entries within a plurality of arrays. A plurality of arrays may include a two-dimensional array, three-dimensional array, or both. For example, the method may include filtering one or more time-stamped entries according to a time-stamp filter and storing the time-stamped entries in a row of an array according to the time-stamp while also filtering the one or more time-stamped entries using an identification filter and storing the time-stamped entries in a column of an array according to the component identifier. In this instance, all entries located within a row of the two-dimensional array have a substantially identical time-stamp while all entries located within a column of the two-dimensional array have a substantially identical component identifier. The one or more entries may be organized within one or more databases based on associated time-stamp identification information. For example, one or more time-stamped entries may be sequentially stored in an array of a database. An array of the database may include one or more time-stamped entries having a similar time-stamp. A similar time-stamp may be a substantially identical time-stamp such that the signals related to the time-stamped entries may have been transmitted and/or received by the processor at substantially the same time. Substantially identical may mean occurring within 0.01 milliseconds or greater, about 0.1 milliseconds or greater, or even about 1 millisecond or greater within the other time-stamped signals. Substantially identical may mean occurring within 10 milliseconds or less, about 5 milliseconds or less, or even 2 milliseconds or less with other signals. Upon being filtered, one or more identified entries which do not match the criteria of one or more identification filters may be referred to as unmatched entries. Unmatched entries may not be stored within the database of a storage medium. Unmatched entries may be discarded (e.g., deleted). Unmatched entries may be stored within another storage medium as a database used by one more data analysis modules. Unmatched entries may be stored within a storage medium have a volatile memory. For example, unmatched entries may be stored within a processor cache for a temporary amount of time.

The one or more storage mediums may receive one or more identified signals during a predetermined time. A predetermined period of time may mean as a generally continuous stream of data (e.g., signals), at predetermined time intervals, upon one or more operating conditions being sensed by one or more monitoring devices, at randomized times, or any combination thereof. A predetermined period of time may allow for only a portion of the signals to be saved within a storage medium. A predetermined period of time may allow for smaller number of entries to be stored within a storage medium and provide for quicker analysis by a processor. An entry outside of (e.g., older than) the predetermined period of time may be transferred for one storage medium to another storage medium for longer term storage. Predetermined time intervals may be advantageous in that the intervals allow for a storage medium to capture a plurality of sequential instantaneous moments of the status(es) of one or more control signals, one or more data signals, or both in substantial real-time. The predetermined time intervals may allow for detecting one or more anomalous or fault conditions within the one or more signals relative to the machine in substantial real-time without having to capture all of the signals occurring over a period of time, thus allowing for more efficient utilization of a processor. Substantially continuous may be a time frequently in which gaps smaller than a period in which one or more fault or anomalous conditions may occur within a machine. Predetermined time intervals may be about every 0.01 milliseconds or greater, about 0.1 milliseconds or greater, about every 0.5 milliseconds or greater, or even about every 1 second or greater. Predetermined time intervals may be about every 10 seconds or less, about 5 seconds or less, about 2 seconds or less, or even about every 1 second or less. One or more control programs, data analysis modules, or both may instruct one or more processors the frequency of transmitting one or more signals to a storage medium.

Exemplary entries within one or more fields of a database related to one or more signals may include one or more values related to a measurement by a monitoring device, one or more statuses of a component, or both. One or more values may include an output voltage, output current, output frequency, component position, part position, scanned value, velocity value, accelerometer value, ambient light reading, part distance, the like, or any combination thereof Executing One or More Data Analysis Algorithms The method of operating a machine may include executing one or more data analysis algorithms. Executing one or more data analysis algorithms may function to identify one or more anomalous conditions, fault conditions, or both within a machine. Executing one or more data analysis algorithms may be particularly advantageous in that a data analysis algorithm may identify an anomalous condition, fault condition, or both in substantial real-time; may identify an anomalous condition, fault condition, or both simultaneously and/or in parallel to a processor controlling operations of one or more components of the machine; or any combination thereof. The step of executing one or more data analysis algorithms of one or more components may be caused by one or more data processors, data analysis modules, or both. A processor may access one or more data analysis modules from one or more storage mediums. The processor, storage medium, or both may be located within the same controller. One or more data analysis modules may be stored within a storage medium having a first and/or a second operating system of a controller. For example, a processor may retrieve one or more data analysis modules from a storage medium hosting a second operating system of a controller. The processor may access one or more data analysis modules from a same or a different storage medium as a storage medium hosting one or more control programs. For example, the processor may access one or more data analysis modules from a storage medium separate from the storage medium having one or more control programs.

One or more data analysis modules may instruct one or more data processors to initiate one or more data analysis algorithms. Upon execution of one or more data analysis algorithms, the one or more data processors may retrieve, analyze, or both one or more (e.g., plurality) of identified entries within a storage medium. The one or more data analysis modules may instruct one or more data processors to analyze identified entries located within a secondary storage medium of a controller. Execution of one or more data analysis algorithms may include one or more processors retrieving and/or executing one or more Fourier Transform algorithms, oscilloscope algorithms, cycle time algorithms, fault algorithms, deviation algorithms, the like, or any combination thereof. During execution of one or more data analysis algorithms, one or more anomalous conditions of faults may be found by a processor. Results from executing one or more data analysis algorithms may be stored within the same storage medium the entries are located in, a storage medium in communication with the processor, a storage medium in remote connection with the processor, or any combination thereof. A processor may temporarily transmit the results from executing one or more data analysis algorithms into a temporary storage area within the same controller as the processor. A processor may transmit the results from executing one or more data analysis algorithms to a storage medium within a server or other storage medium via a network connection.

The method of operating a machine may include identifying the absence and/or presence of one or more anomalous conditions, faults, or both related to one or more components of the machine. The absence and/or presence of one or more anomalous conditions, faults, or a combination thereof may be identified by a processor upon execution of one or more data analysis modules. Upon execution of one or more data analysis modules, a processor may identify one or more entries within a database indicating an anomaly, fault, or both. The entry may be related to a specific component, monitoring device, time, or combination thereof. Based on one or more identifiers (e.g., time-stamp, component identifier), a processor may be able to identify a fault and/or anomaly with specificity. One or more data analysis modules may instruct one or more processors to display the presence and/or absence of one or more anomalous conditions, faults, or both on a user viewable interface of the system. The presence of one or more anomalous conditions and/or faults may be displayed as one or more or more errors in a machine, may display the one or more components the anomalous condition and/or fault has been associated with, or both. The presence of one or more anomalous conditions and/or faults may cause one or more data analysis modules to instruct one or more data processors to cease (e.g., stop, pause, and/or end) one or more operations of one or more components of the machine. Upon detecting a presence of one or more anomalous conditions and/or faults, a data analysis module may instruct a processor to transmit one or more signals via a network to one or more servers identifying the anomaly and/or fault. For example, a fault condition identified by a processor in a controller may transmit the fault condition via a network to a server, which then displays the fault condition on a user's computing device (e.g., personal computer within the facility).

Scheduling Predictive Maintenance or Service

The method of operating a machine may include scheduling predictive maintenance, service, or both of one or more components of a machine. Upon identification of the presence of one or more anomalous conditions and/or faults, such as by one or more processors executing one or more data analysis modules, one or more processors may schedule predictive maintenance, service, or both. The one or more processors may send one or more maintenance signals to a server or user computing device, such as over a network. The maintenance signal may include the identification of the one or more components having one or more anomalous conditions and/or faults, the time of occurrence of the anomalous condition and/or fault, the fault and/or anomaly detected, or any combination thereof. Predictive maintenance may be advantageous as it may use an anomalous condition to schedule maintenance before a component actually faults and becomes non-functional. Predictive maintenance may be advantageous over preventive maintenance, as maintenance tasks are performed on a component when warranted (as identified by the anomalous condition), as opposed to a routine or time-based preventive maintenance schedule. Preventive and Predictive Maintenance are explained in detail in Complete Guide to Preventive and Predictive Maintenance by Joel Levitt and published in 2003, incorporated herein by reference in its entirety for all purposes.

ILLUSTRATIVE EMBODIMENTS

FIG. 1 illustrates a block diagram of a traditional factory information system architecture of a control system 10 known in the prior art. The control system 10 includes a plurality of controllers 12 for a machine. The controllers 12 are local floor level controllers for the machine (not shown), such as one or more programmable logic controllers (PLC), dedicated personal computers (PC), micro controllers, and the like. Each controller 12 is configured to control functionality of a machine (not shown). Each controller 12 includes a data processor 14, storage medium 16, and network interface 18. Via the network interface 18 each controller 12 is connected to the facility information network 20. Raw data 22 from each controller 12 is sent to a server 30 over the network 20. Other process data can be sent to or collected from each controller 12 to the server 30 and vice-versa. The server 30 also includes a network interface 18, processor 14, and network interface 18. The server 30 typically analyzes the data, provides data compression, and/or stores the data for longer periods of time. The data 22 transmitted from a controller 12 to the server 30 is typically not guaranteed to be collected at specific intervals.

Figure 2:
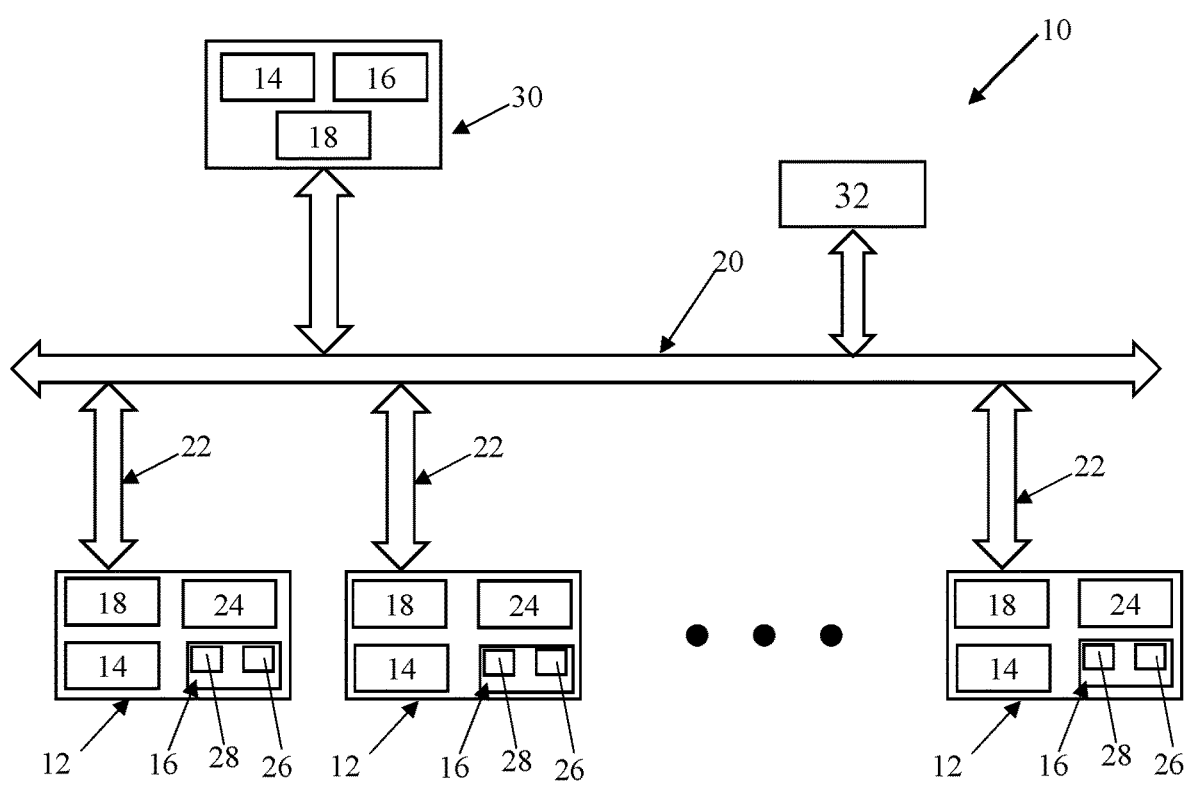
FIG. 2 illustrates a block diagram of a control system according to the teachings presented herein.

FIG. 2 is a block diagram of a control system 10 according to the teachings herein. The control system 10 includes a plurality of controllers 12 for a machine. The controllers 12 include one or more processors 14, storage mediums 16, and network interfaces 18. The controllers 12 are each configured to control a machine (not shown). The controller 12 includes one or more control programs 28. The one or more control programs 28 may be stored within the storage medium 16 of the controller 12. The one or more control programs 28 may be accessible by one or more processors 14 to control one or more operations of the machine (not shown). Each controller 12 may include one or more programmable logic controllers (PLC), dedicated personal computers (PC), micro controllers, and the like. On a predetermined frequency, data sent to or received by the controller 12 is stored within a secondary storage medium 24 of the controller 12. The data is collected and stored in substantially real-time. The secondary storage medium 24 may be a temporary storage area, such as Random-Access Memory (RAM). Located within the controller 12 is one or more data analysis modules 26. The one or more data analysis modules 26 may be located within the storage medium 16. The data analysis modules 26 are separate programs which are configured to work with one or more processors 14 to access the data within the secondary storage medium 24. The data analysis modules 26 are separate from the one or more control programs 28 and do not control operations of the machine (not shown). Using the one or more data analysis modules 26, the one or more processors 14 are able to use the data stored within the secondary storage medium 24 to perform one or more algorithms, such as one or more diagnostic algorithms. The one or more processors 14 are able to perform the one or more algorithms while simultaneously controlling one or more operations of the machine (not shown). The one or more data analysis modules 26 may be added to and/or removable from the controller 12 as or when desired by a user.

The one or more data analysis modules 26 may also be able to instruct the one or more processors 14 to preprocess data stored within the secondary storage medium 24 for shipment to the server 30 or another storage medium 32. The one or more data analysis modules 26 may be able to instruct the one or more processors 14 to continuously update the secondary storage medium 24 with new incoming data (e.g., from the predetermined time period) and transfer older data (e.g., outside of the predetermined time period) to the server 30. The data may be transmitted via the network 20 to the server 30 or other storage medium 32. The server 30 or other storage medium 32 may function to store the data or the server 32 may be useful in performing further analysis on the data from the controller 12.

Figure 3:
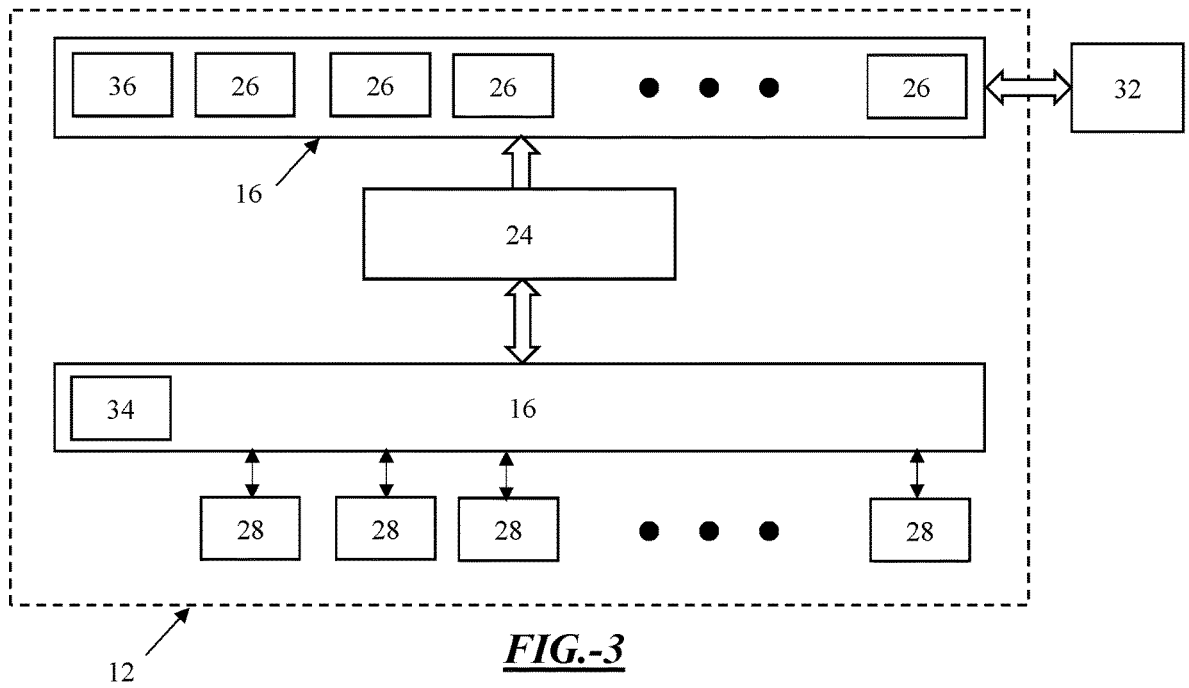
FIG. 3 illustrates a block diagram of a controller of a control system according to the teachings herein.

FIG. 3 is a block diagram illustrating the sub-components of a controller 12. The controller 12 includes one or more storage mediums 16. The one or more storage mediums 16 include a plurality of control programs 28 stored therein.

The control programs 28 are configured to control operating of one or more operations of a machine (not shown). The plurality of control programs 28 are retrievable by one or more processors 14 (not shown) to control operations of one or more components (not shown) of one or more machines. The one or more storage mediums 16 may be associated with a first operating system 34 of the controller 12. The processors 14 direct at least some of the process data transmitted from and/or received by the processor 14 to a secondary storage medium 24. The secondary storage medium 24 may be a temporary storage area, such as a random-access memory. The control programs 28 may utilize some of the data stored within the secondary storage medium 24 to control one or more operations of one or more components of the machine. Thus, there is two-way communication between the secondary storage medium 24 and the one or more control programs 28, or the processor 14 associated with executing the one or more control programs 28. The secondary storage medium 24 is accessible by one or more processors 14. One or more data analysis modules 26 may direct one or more processors 14 to retrieve and/or store data within the secondary storage medium 24. The one or more data analysis modules 26 may be located within a storage medium 16. The storage medium 16 may be the same as or different than a storage medium 16 having the control programs 28 stored therein. The one or more data analysis modules 26 may be part of a storage medium associated within a second operating system 36 of the controller. The data analysis modules 26 are compatible with another storage medium 32. Exemplary data analysis modules 26 include cycle to cycle time analysis, inter-process signal timing diagrams, signature analysis of key process elements, data compaction, and the like.

Figure 4:
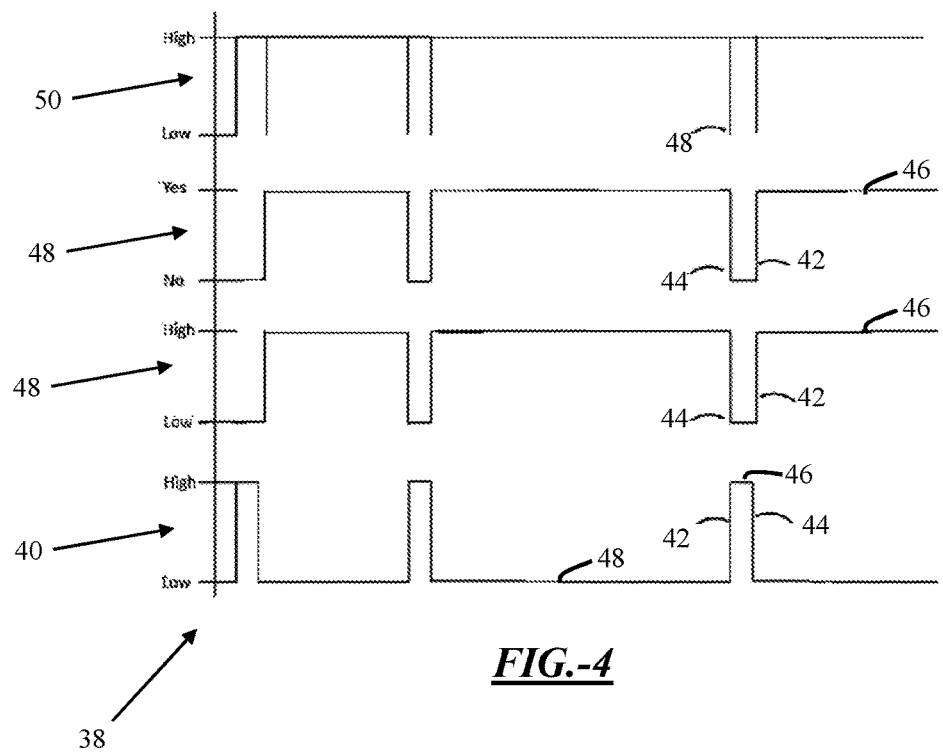
FIG. 4 illustrates a block diagram of a processor load control function according to the teachings herein.

FIG. 4 is a block diagram illustrating a processor load control 38 useful within a controller 12 (not shown). The processor load control 38 can be implemented as a control program 28. The processor load control 28 may be cyclical in nature, as shown in FIG. 4. Typical processor usage 40 of a processor 14 as used by a control program 28 is illustrated. The processor utilization indicates an increase in processor utilization 42, a decrease in processor utilization 44, and a peak in processor utilization 46 while executing one or more control programs 28 to control operations of one or more components of a machine. For example, in a part transfer process if the component of a machine included a robotic part transfer end effector, the processor would have a highest intensity of processor usage while instructing the robotic part transfer end effector to transfer a part according to one or more control programs, and once the transfer was completed, the processor utilization would be significantly reduced. The processor load control 38 may issue a control signal to one or more processors to execute one or more data analysis modules 26 during valleys 48 of lower processor usage between peaks 46 or to reduce processor usage of one or more data analysis modules 26 during peaks 46 of processor utilization. The processor load control 38 allows for peaks of processor usage 46 related to executing one or more data analysis modules to occur during valleys 48 of processor utilization related to executing one or more control programs 28. The end result is that one or more processors 14 are able to remain at a high, and possibly more consistent, utilization state as shown in the aggregated processor load control 50. There may be temporary low processor usage points or valleys 46 in the aggregated processor load 50 during the transition of large processor usage between the control program 28 and the data analysis modules 26.

Figure 5:
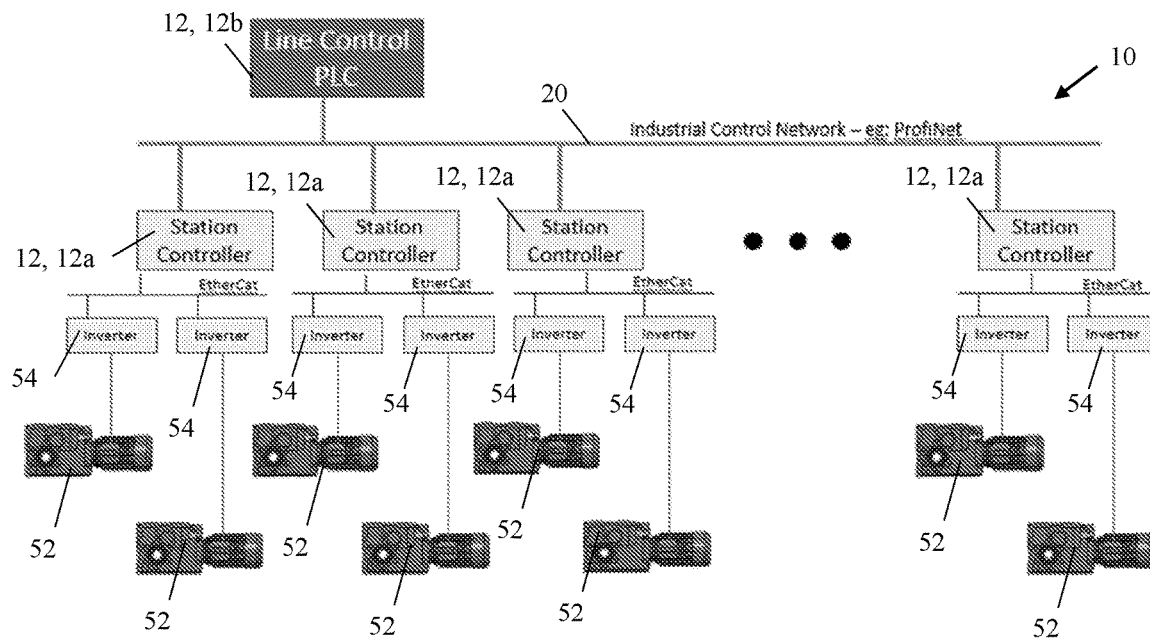
FIG. 5 illustrates an exemplary control system for a plurality of machines according to the teachings herein.

FIG. 5 illustrates an overview of a control system 10 for a plurality of machines 52. Each machine 52 includes a plurality of components 60 (not shown). For example, each machine may be considered a station within a manufacturing facility. Each machine 52 is in communication with an inverter 54. Each inverter 54 is in communication with a controller 12, such as a station controller 12*a*. Via a network 20, each station controller 12*a* is in communication with a facility controller 12*b*.

Figure 6:
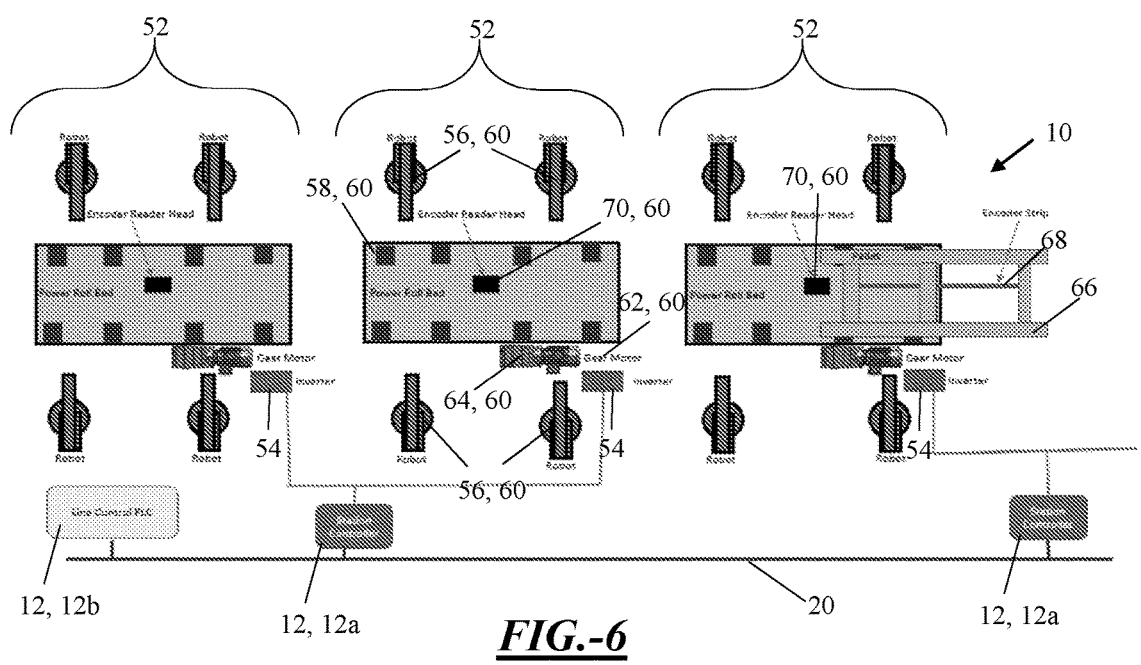
FIG. 6 illustrates a close-up view of a control system for one station as illustrated in FIG. 5.

FIG. 6 illustrates an exemplary view of a control system 10 of FIG. 5. An inverter 54 is in communication with a machine 52. A machine 52 is considered a station. Each station includes a plurality of robots 56 which each roller bed 58. The robots and roller bed 58 are considered components 60 of the machine 52. The inverter 54 is in communication with a motor 62 and gear box 64 which drive the powered, roller bed 58. The motor 62 and gear box 64 are also considered components 60 of the machine 42. A pallet 66 having an encoder strip 68 is transferred into each station 52 via actuation of the powered roller bed 58 via the motor 62. The encoder strip 68 passes over an encoder reader head 70 of each powered roller bed 58. Upon entry into position within each station 52, the robots 56 perform work on any part (e.g., vehicle body or vehicle body component) located on the pallet 66.

FIG. 7 illustrates a data structure 72. The data structure 72 may be useful within a storage medium 16, including a secondary storage medium 24. The data structure 72 is in an array structure. The array structure is a two-dimensional array structure. The data structure 72 includes a plurality of rows 74 and a plurality of columns 76. Each row 74 is dedicated to one or more data entries 80 having a substantially identical time-stamp 78. Each column 76 is dedicated to data entries 80 tied to the same component 60. The data structure 72 receives the data entries 80 upon being time-stamped by a data processor 14 (not shown) and at a predetermined frequency. In this example, the data structure received the time-stamped data entries 80 every 10 milliseconds.

Figure 8A:
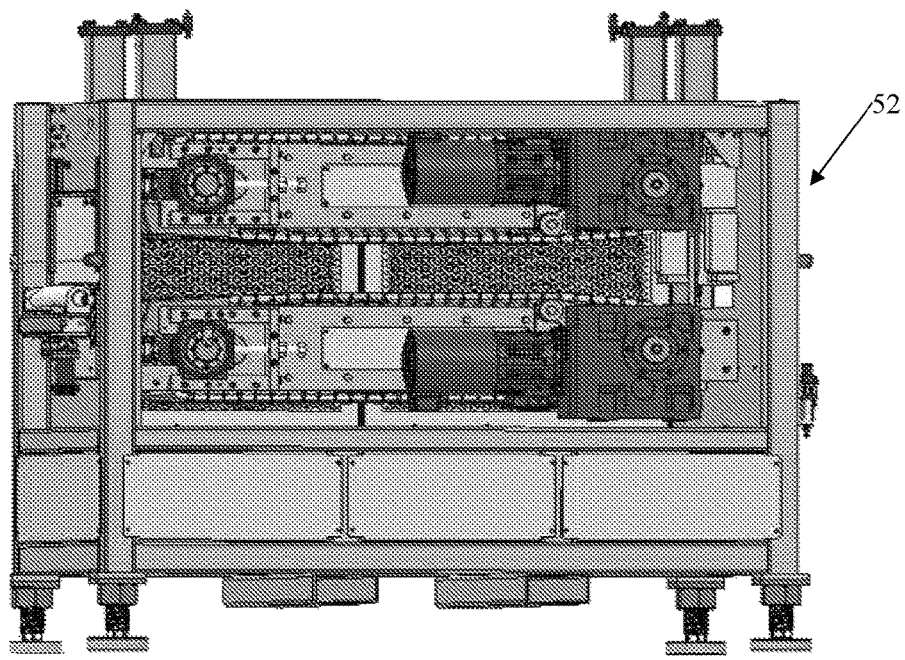
FIG. 8A illustrates an exemplary machine employing a control system according to the teachings herein.
Figure 8B:
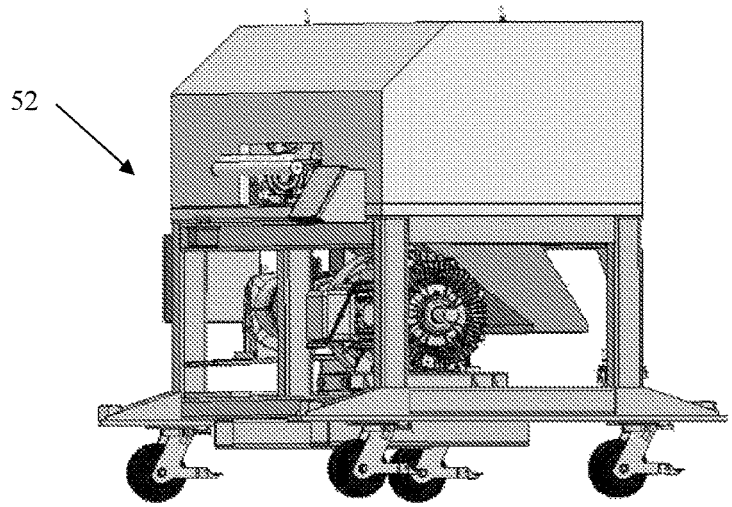
FIG. 8B illustrates an exemplary machine employing a control system according to the teachings herein.

FIGS. 8A and 8B illustrate a machine 52 part of a control system 10. The machine 52 is an exemplary extrusion machine.

Figure 9:
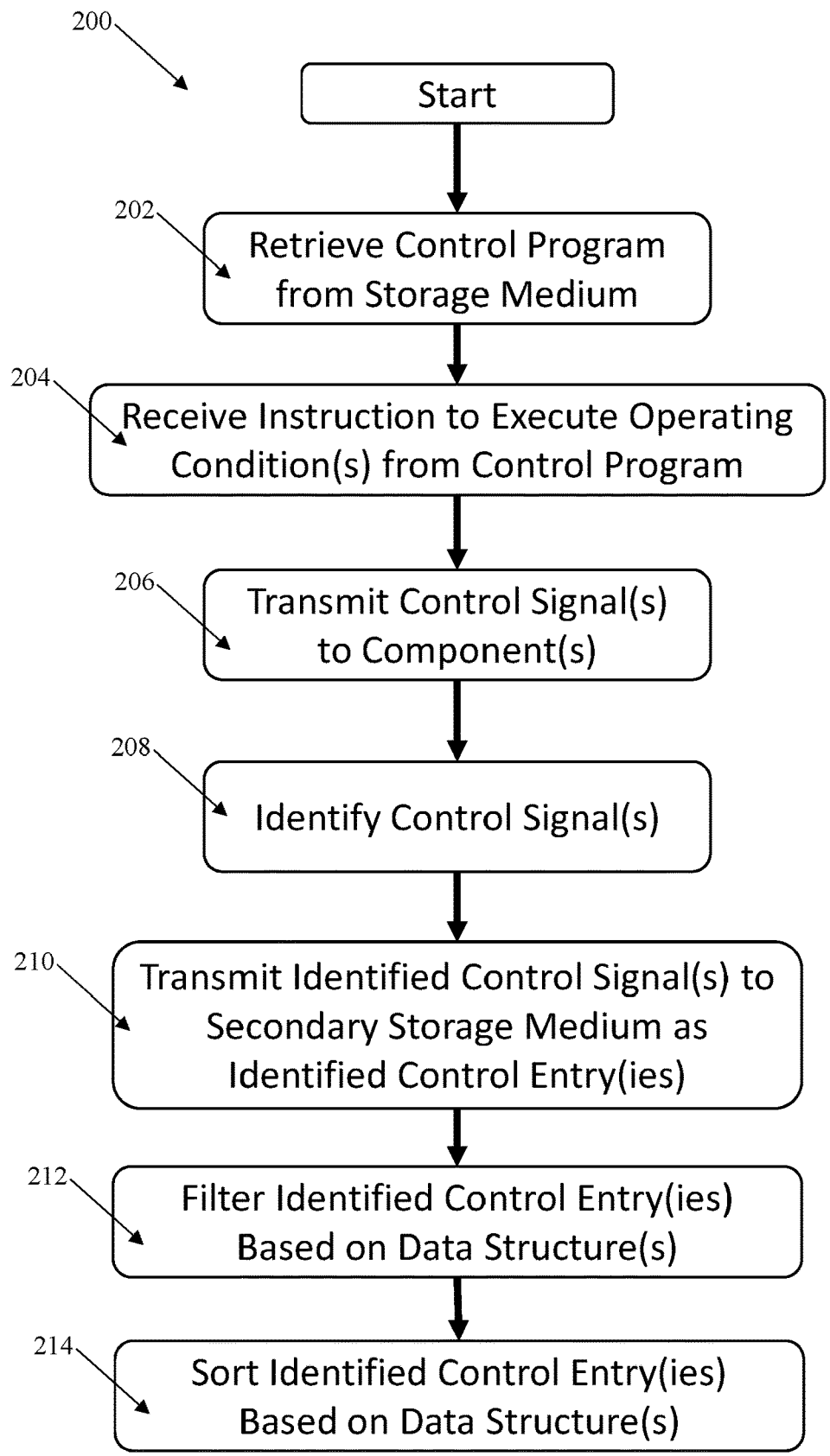
FIG. 9 illustrates a process of transmitting one or more control signals according to the teachings herein.

FIG. 9 illustrates a process 200 of a control system 10 for controlling operation of a machine 52 including a plurality of components 60. The process 200 starts with a processor retrieving one or more control programs from a storage medium 202. The storage medium may be located within the same controller as the processor. After retrieving the control program, the processor executes the control program and receives instruction to execute one or more operating conditions of one or more components for the machine 204. To execute one or more operating conditions, the processor transmits one or more control signals to one or more components 206. Upon transmission of the one or more control signals, the processor identifies the control signals 208. Identifying the control signal may include identifying the control signal with a time-stamp, component identification, or both. In addition to transmitting the one or more control signals to one or more components, after identifying the control signals, the identified control signals are transmitted to a secondary storage medium as identified control entries 210. Upon receipt of the identified control entries within the storage medium, the identified control entries are filtered based on the data structure of the storage medium 212. Only identified control entries which match the one or more identification filters remain within the data structure. After filtering, the identified control entries are sorted within the data structure 214. The identified control entries may be sorted within the data structure based on a time-stamp, component identifier, or both.

Figure 10:
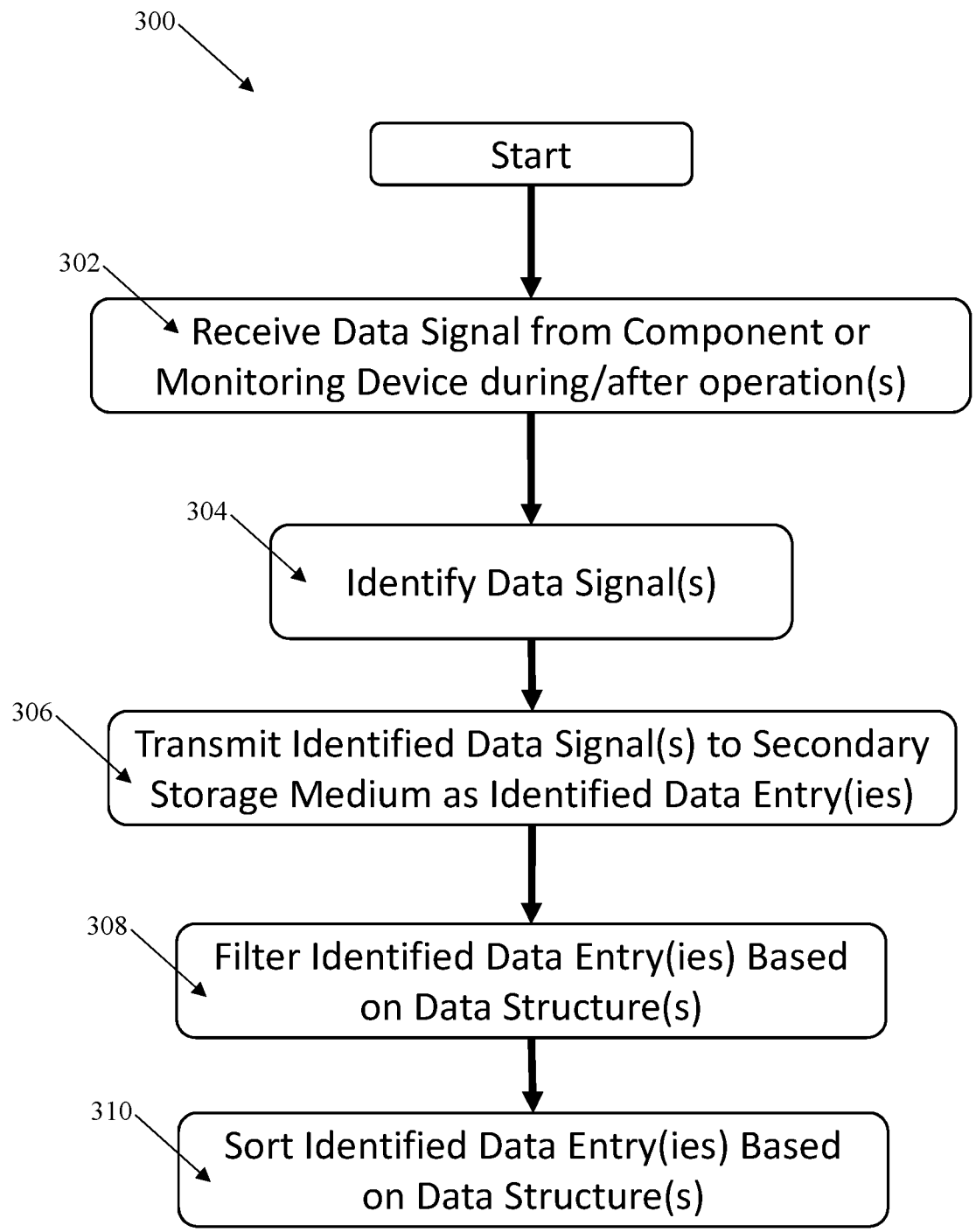
FIG. 10 illustrates a process of transmitting one or more data signals according to the teachings herein.

FIG. 10 illustrates a process 300 of a control system 10 for transmitting one or more data signals to a storage medium. The process 300 begins with one or more processors receiving one or more data signals from a component and/or monitoring device during operation of one or more components 302. Upon receipt of the one or more data signals within the processor, the one or more data signals are identified 304. Identification of a data signal may include time-stamping the data signal with a time received within the processor, a component or monitoring device the data signal was transmitted from, or both. After identification of the one or more data signals, the one or more data signals are transmitted to as secondary storage medium to store as one or more identified data entries 306. Upon receipt of the identified data entries within the storage medium, the identified data entries are filtered based on the data structure of the storage medium 308. Only identified data entries which match the one or more identification filters remain within the data structure. After filtering, the identified data entries are sorted within the data structure 310. The identified data entries may be sorted within the data structure based on a time-stamp, component identifier, or both.

EXAMPLES

Example A: Powered Roller Conveyor Bed

A plurality of stations are located in sequence within a Body Shop build line of an automotive manufacturing facility. The stations may be similar to the stations as shown in FIGS. 5-6. Each station is referred to as a machine, and the components within the station are the components of that machine. The stations are tied together over a network to a single line control programmable logic controller (PLC). Each station includes a plurality of robots which perform manufacturing tasks on an automotive body as the body is located within each station. Each station includes a power roller conveyor bed to transfer the pallet from station to station.

Each station includes a plurality of components, in addition to a power roller bend. The components include an inverter drive, gear box, motor, station controller, absolute encoder reader, and manufacturing robots for performed work on the vehicle body. The PLC coordinates transfer of pallets from the roller bed within the station to a subsequent roller bed and initiates and coordinates ancillary devices (robots) to work on a vehicle body once in station. The inverter drive powers a motor which causes movement of the roller bed. The gear box couples the motor to the roller bed. The absolute encoder reader reads the position of the pallet on the powered roller conveyor bed once within station.

Each station is in communication with a station controller. The station controller includes at least one data processor having a control program thereon. The control program executes the work of the components within the station. The station controller is a multi-tasking computer having multiple operating systems. Specifically, the station controller is a multi-tasking computer with Linux running as a real-time control operating system while also running in tandem with Windows Embedded Contact operating system. The station controller is referred to as the data processor. The control program(s) which execute operation of components reside within the Linux operation system. Data analysis modules which execute analysis of process data reside within the Windows operating system.

The machine further includes a plurality of monitoring devices which sense a number of signals of the components. The monitoring devices monitor control signals from the PLC to the station controller; status signals from the station controller to the PLC, including the actual position of the pallet in the station, a virtual position of the pallet in the station, acceleration forces, and error signals; and inverter data including direct current bus voltage current of the motor, voltage of the motor, and a status of a brake in a gear box.

Data is collected during operation of the components within each station. For example, data is collected during operation of a power roller conveyor bed within the station. Upon the start of the transfer cycle (pallet moving from one station to the next via the power roller beds), all monitor signals are placed into a storage medium every 10 milliseconds. The storage medium is a random-access memory in communication with the station controller. The data is stored in an array structure. Each row of the array represents a 10-millisecond time period. All data transmitted via the station controller and data monitored by the monitoring devices is synchronized to the 10 millisecond time intervals. Thus, the control signals from line control PLC, status signals from the station controller, inverter direct current bus voltage, current of the motor, voltage of the motor, status of the brake, position of the pallet, accelerometer data, and any error statuses displayed in one row are from the exact same 10 millisecond time period. Upon completion of a transfer cycle (completion of transition of a pallet from one station to the next), the data array is then exported from the Linux operating system to the Windows Embedded Contact operating system for subsequent analysis.

Exemplary Problem A1 Based on Example A

The station controller, specifically the Windows Embedded Contact operating system runs one or more data analysis modules (e.g., algorithms) analyzing the data collected in the storage medium. One algorithm includes a Fast Fourier Transform (FFT) algorithm. The FFT algorithm detects a large power impact in the 20 Hz range. In the data array in the storage medium, the disturbance is identified in the $123^{rd}$ row of collected data or 1.230 seconds into the transfer of the pallet from one station to the next.

The stored data allows for reviewing all of the monitored signals, including control signals from the Line Control PLC and inverter. No issues, including dropped signals, are identified with respect to the control signals from the line control PC and inverter. The pallet position virtually reports a location where the front of the pallet would be engaging the first roller in a next conveyor. This condition is seen in all subsequent transfer cycles at about the same time within the transfer cycle. A maintenance team is sent to inspect the first roller on the next bed (receiving power roller bed) and it is noticed a weld holding the leg of the roller bed below the first roller has broken. That roller is now ⅛" higher than it should be. Maintenance is able to schedule a repair of the weld during the next production break. This eliminates the rest of the system from experiencing a large shock during each transfer and thus increasing the uptime of the equipment. Further, by scheduling this maintenance by identifying the anomaly (large power impact), subsequent potential downtime is avoided in which the receiving roller bed may have been rendered unusable.

Exemplary Problem A2 Based on Example A

At the end of a transfer cycle, robots in a station do not start work on a vehicle on a pallet. The Line Control PLC identifies the condition of the pallet not being into position within the station on the power roller bend. A data analysis module having a control signal analyzer and running on the Windows Embedded Contact side of the system sees no issues with any signal timing. The control signal analyzer does determine that the safety light screen in that station loses its "Clear to Transfer" signal 0.100 seconds prior to the "Conveyor Stopped" signal being sent by the station controller. Once the "Clear to Transfer" signal is lost, the station controller initiates an emergency stop sequence. The emergency stop sequence brings the pallet on a predetermined deceleration curve without regard to its position within station. This signal indicates either a faulty light screen or an operator of the station jumping into the cell before the pallet has come to a complete stop. There is no issue with the station controller, inverter, or greater motor. As such, no call to maintenance is needed.

Example B: Co-Extrusion Process

A control system controls operation of co-extrusion of plastic over fiber. The control system operates a machine having a plurality of components. The machine may be illustrated as the machine in FIGS. 8A and 8B. Some of the components include a pelletizer, puller, infeed roll, motor, single board computer, inverter drives, manual control boxes, control relays, air cylinders, and drive rollers. The single board computer provides overall line control to the process. The inverter drive powers a motor running a pelletizer, puller, and infeed roll for the co-extrusion. The manual control boxes contain push buttons for remote start and stop controls of the co-extrusion process. The control relays combine the remote start and stop signals. The air cylinders apply pressure to drive rollers.

The co-extrusion machine is in communication with two data processors. The two data processors are located on a dual processor computer board with a shared random-access memory (e.g., storage medium). The shared random-access memory is a dual port RAM. One processor includes the control program for execution and controlling operation of the co-extrusion. The other processor includes the data analysis modules for analyzing process data gathered from the process.

The co-extrusion machine also includes a plurality of monitoring devices which monitor control box signals (e.g., control signals form the processor to the components), air pressure, inverter data (including direct current bus voltages, motor current, motor voltage, and motor speed).

Ever 5 milliseconds, the control program relays process data gathered from the monitoring devices, components, and control box signals into the random-access memory. The data is stored in an array structure where each row represents data at 5 millisecond intervals. All data gathered for an interval is synchronized within the memory. The data is continually streamed into the dual port RAM on a first in, first out basis.

Exemplary Problem Based on Example B

The control program is continuously streaming data every 5 milliseconds to the random-access memory. Based on analysis of the process data, the data analysis module sees a current of a puller motor drop in the $300^{th}$ row of the array and then a climb 15% in the $320^{th}$ row of the array. The inverter motor speed dropped and then increased in the same $300^{th}$ and $320^{th}$ rows.

The data analysis module determines that the air pressure was constant during this period and thus a loss of grip on the fiber did not occur. The data analysis module identifies a control box signal from the relay indicating a request to run turned off in the $299^{th}$ row and back on in the $319^{th}$ row. This indicates a loose wire is located between the run relay and the single board computer's power controls. Thus, a maintenance team is able to be provided with both the cause and location of the problem (loose wire) before the connection is no longer existent and results in more significant problems and actual production downtime.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:
1. A method of operating a machine having two or more components with a control system comprising:
    a) controlling one or more operations of each of the two or more components of the machine using one or more data processors with a plurality of control signals;
    b) time-stamping the plurality of control signals with the one or more data processors to form time-stamped control entries corresponding with the plurality of the control signals;
    c) storing the time-stamped control entries for subsequent retrieval in a storage medium;
    d) sensing a plurality of operating conditions of each of the two or more components of the machine with two or more monitoring devices, wherein the sensing is simultaneous with the controlling step and at a predetermined condition frequency, and wherein the two or more monitoring devices communicate by transmitting data signals corresponding to the plurality of operating conditions substantially in real-time to the one or more data processors;

e) time-stamping the data signals with the one or more data processors to form time-stamped data entries corresponding with the data signals; and f) storing the time-stamped data entries for subsequent retrieval in the storage medium; and wherein the method includes automatically filtering the time-stamped control entries and the time-stamped data entries prior to and for storage within the storage medium using one or more time-stamp filters;

wherein the storage medium includes a predefined data structure having a multi-dimensional array structure;

wherein one dimension of arrays of the multi-dimensional array structure is identified by a pre-determined time interval over a predetermined time period;

wherein the storing the time-stamped data entries, the time-stamped control entries, or both includes matching the pre-determined time interval with the time-stamp of the time-stamped data entries, the time-stamped control entries, or both; and wherein a frequency of acquiring and storing the data signals, the control signals, or both is every 0.1 milliseconds to every 10 seconds.

2. The method according to claim 1, wherein the one or more data processors access and execute one or more control programs to control the one or more operations; and wherein the one or more control programs are stored within another storage medium as compared to the time-stamped data entries and the time-stamped control entries.

3. The method according to claim 2, wherein the storage medium in which the one or more control programs are stored is nonvolatile memory while the storage medium in which the time-stamped data entries and the time-stamped control entries are stored is volatile memory.

4. The method according to claim 3, wherein the method includes retrieving and analyzing the time-stamped data entries and the time-stamped control entries from the storage medium for a predetermined period of time using the one or more data processors and executing one or more data analysis modules; and wherein the one or more data analysis modules are stored within a storage medium separate from the volatile memory and in communication with the one or more data processors.

5. The method according to claim 4, wherein the one or more control programs and the one or more data analysis modules are stored within the same storage medium.

6. The method according to claim 4, wherein the one or more data analysis modules include one or more data analysis algorithms which ascertain a presence or absence of one or more anomalous conditions, one or more faults, or both of the two or more components within the time-stamped data entries, the time-stamped control entries, or both.

7. The method according to claim 6, wherein the one or more data analysis algorithms determine an interdependence between one or more of the time-stamped control entries and one or more of the time-stamped data entries, between two or more of the time-stamped control entries, between two or more of the time-stamped data entries, or any combination thereof.

8. The method according to claim 6, wherein the one or more data analysis algorithms calculate one or more trends of the time-stamped data entries, the time-stamped control entries, or both over the predetermined period of time.

9. The method of claim 8, wherein at least one of the time-stamped data entries and/or one of the time-stamped control entries deviating from the one or more trends is identified as the one or more anomalous conditions.

10. The method according to claim 6, wherein the one or more data analysis algorithms include one or more Fourier Transform algorithms, oscilloscope algorithms, cycle time algorithms, fault algorithms, deviation algorithms, or a combination thereof.

11. The method according to claim 6, wherein the method includes automatically scheduling predictive maintenance or service to be performed upon the machine based on occurrence or detection of the one or more anomalous conditions, the one or more faults, or both of the two or more components and/or an absence of detection of the one or more anomalous conditions, the one or more faults, or both of the two or more components.

12. The method according to claim 6, wherein the method includes automatically identifying and alerting a user of an occurrence or a detection of the one or more anomalous conditions, the one or more faults, or both; and wherein alerting the user includes automatically displaying the one or more anomalous conditions, the one or more faults, or both on a user viewable interface.

13. The method according to claim 6 wherein the storage medium receives the time-stamped data entries, the time-stamped control entries, or both as one or more generally continuous streams of data;

wherein the one or more data processors receive the data signals, the time-stamped data entries, or both as one or more generally continuous streams of data; and wherein generally continuous is a time frequency with gaps smaller than a period in which the one or more anomalous conditions, the one or more faults, or both occur.

14. The method according to claim 6, wherein the retrieving and analyzing step is completed while the machine is actively operating.

15. The method according to claim 1, wherein one or more control programs and one or more data analysis modules are located within a drive of a controller; the storage medium into which the time-stamped data entries, the time-stamped control entries or both are stored is a random-access memory of the controller; and the one or more data processors are also within the controller.

16. A control system which controls operation of a machine having two or more components and comprises:

a) one or more first storage mediums having one or more control programs stored therein, wherein the one or more control programs are configured to instruct one or more data processors to control operations of each of the two or more components of the machine;

b) the one or more data processors in communication with the one or more first storage mediums and further configured to time-stamp a plurality of control signals to form time-stamped control entries and time-stamp a plurality of data signals to form time-stamped data entries;

c) one or more monitoring devices in communication with the one or more data processors and configured to sense a plurality of operating conditions of the two or more components of the machine and transmit the plurality of data signals corresponding to the plurality of operating conditions to the one or more data processors, wherein the one or more monitoring devices are configured to sense the plurality of operating conditions of the two or more components simultaneous with the control operations of the two or more components by the one or more data processors;

d) one or more secondary storage mediums in communication with the one or more data processors and configured to receive the time-stamped control entries and the time-stamped data entries from the one or more data processors;

wherein the one or more secondary storage mediums includes a predefined data structure having a multi-dimensional array structure; and wherein one dimension of arrays of the multi-dimensional array structure is identified by a pre-determined time interval over a predetermined period of time; and wherein the pre-determined time interval is 0.1 milliseconds to 10 seconds.

17. The control system of claim 16, wherein the one or more first storage mediums further include one or more data analysis modules stored therein, and wherein the one or more data analysis modules are configured to instruct the one or more data processors to retrieve and analyze the time-stamped data entries and the time-stamped control entries from the one or more second storage mediums for a predetermined period to identify a presence, absence, or both of one or more anomalous conditions, one or more faults, or both of at least one of the two or more components.

* * * * *